Feb. 26, 1963  P. H. McGARRELL  3,079,522
AUTOMATIC MACHINE TOOL CONTROL
Filed March 31, 1958  12 Sheets-Sheet 1

Inventor
Paul Harry McGarrell
By Hill, Sherman, Meroni, Gross & Simpson
Attys.

Feb. 26, 1963  P. H. McGARRELL  3,079,522
AUTOMATIC MACHINE TOOL CONTROL
Filed March 31, 1958  12 Sheets-Sheet 2

Inventor
Paul Harry McGarrell

Feb. 26, 1963  P. H. McGARRELL  3,079,522
AUTOMATIC MACHINE TOOL CONTROL
Filed March 31, 1958  12 Sheets-Sheet 7

Inventor
Paul Harry McGarrell

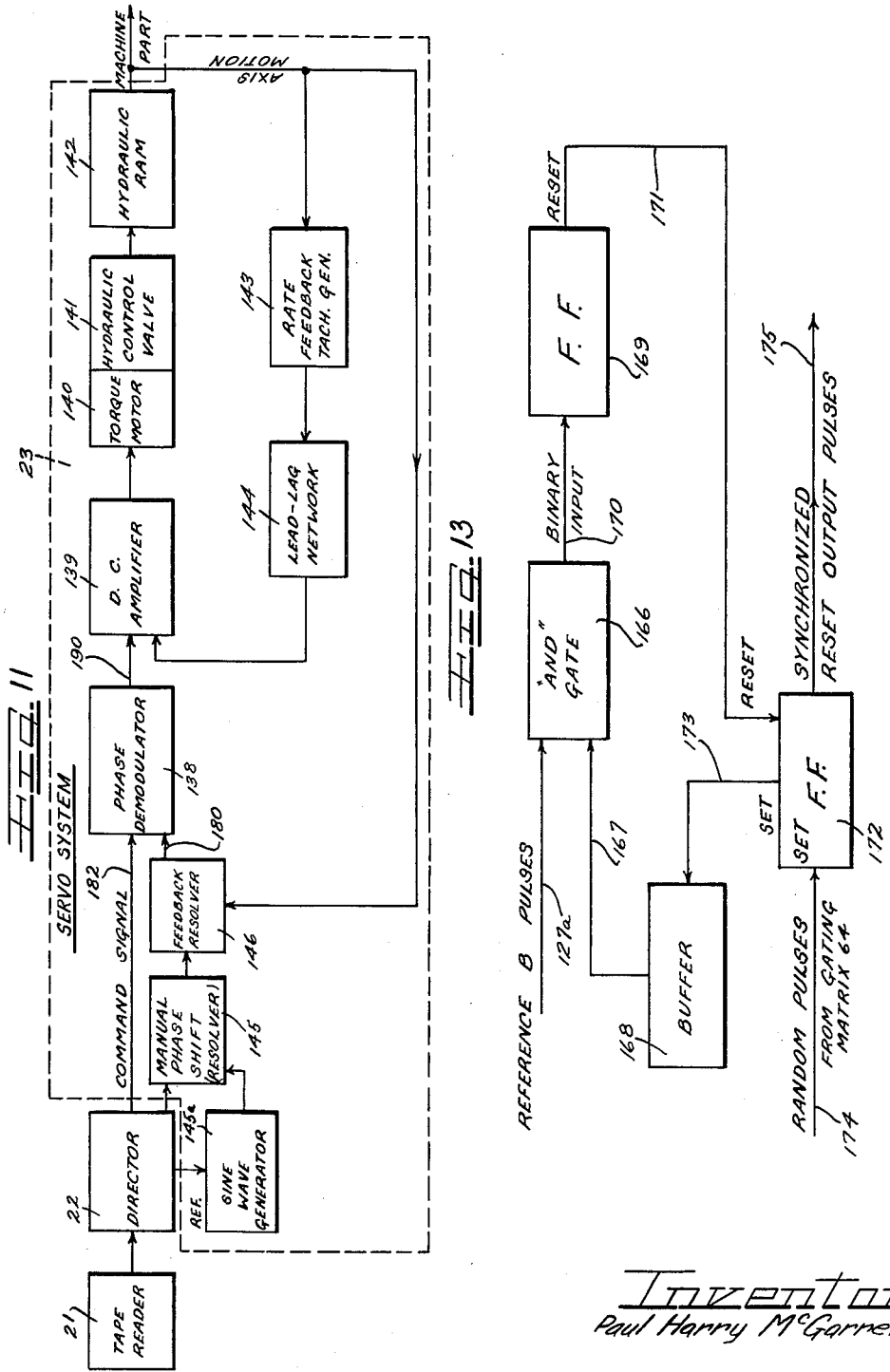

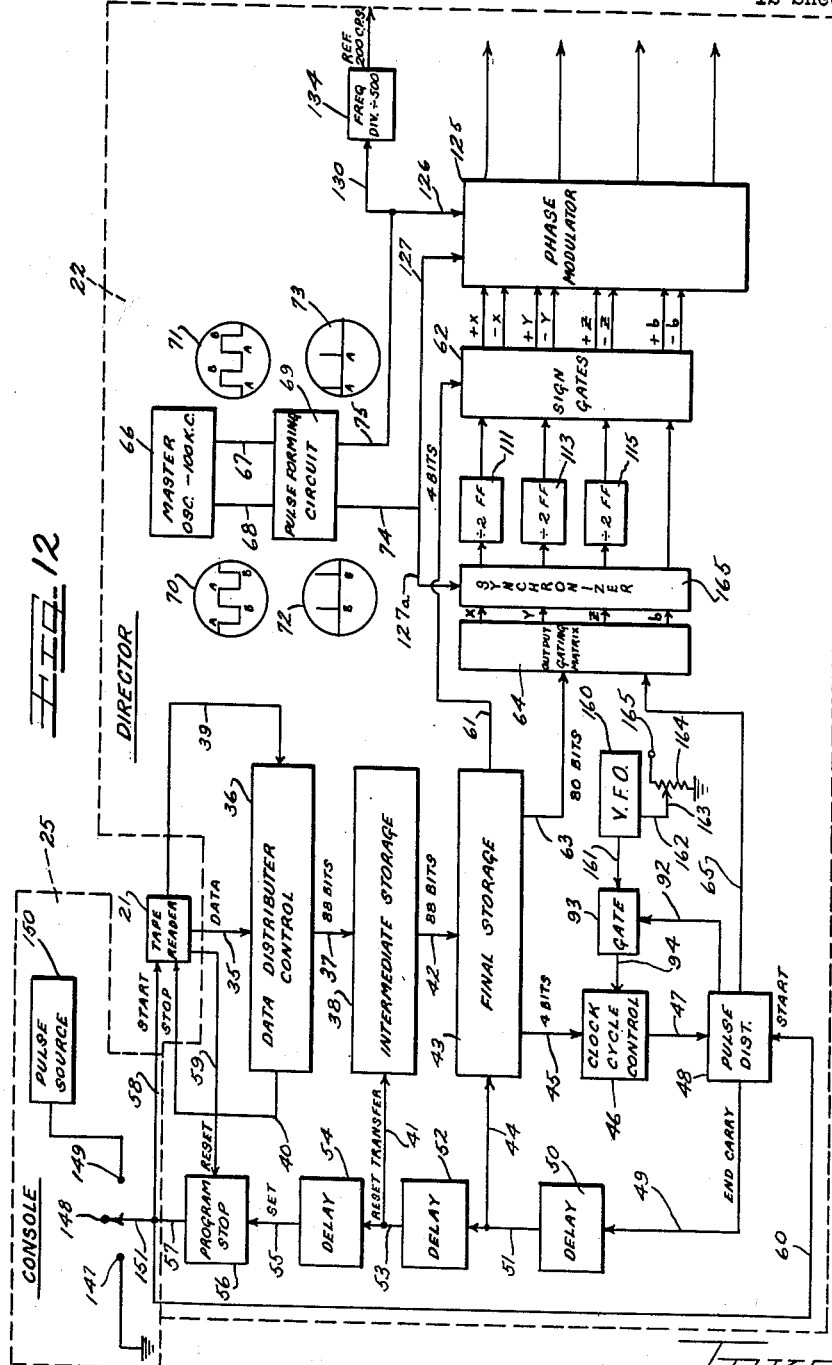

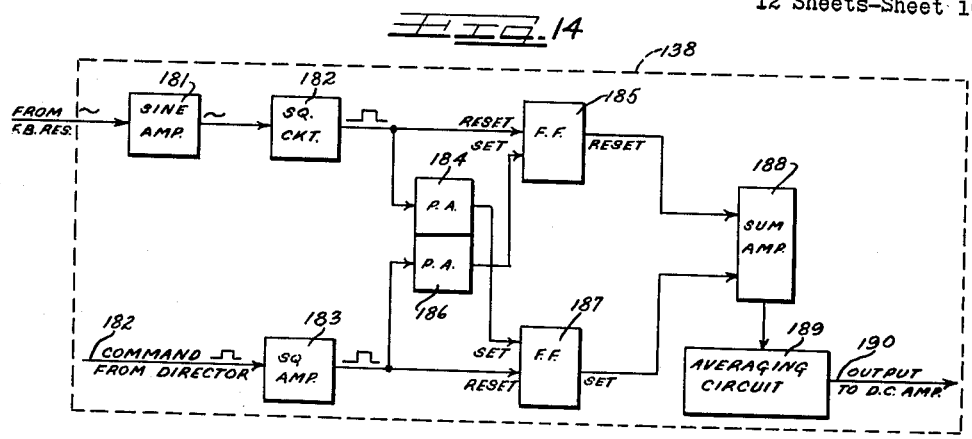
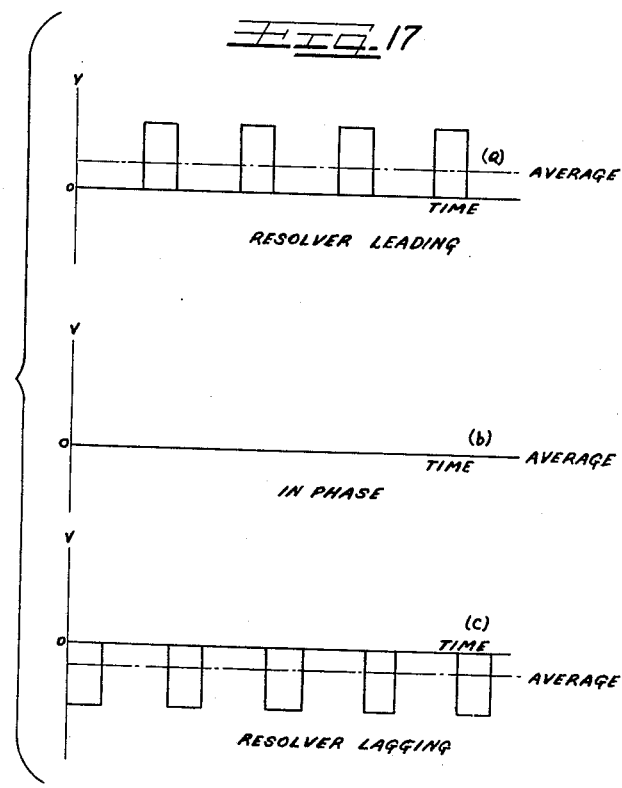

Feb. 26, 1963  P. H. McGARRELL  3,079,522
AUTOMATIC MACHINE TOOL CONTROL
Filed March 31, 1958  12 Sheets-Sheet 11
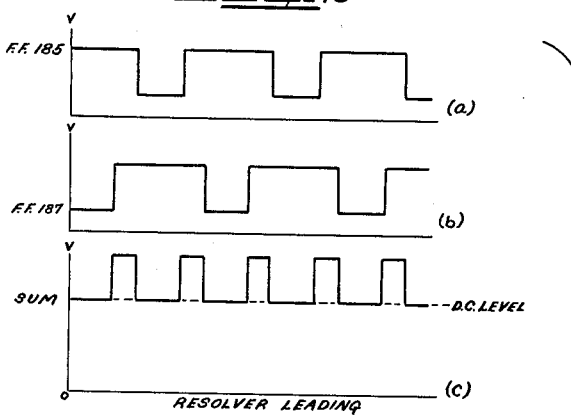
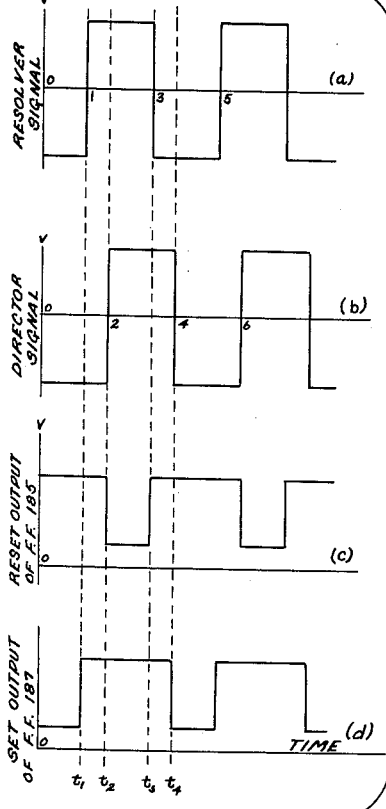
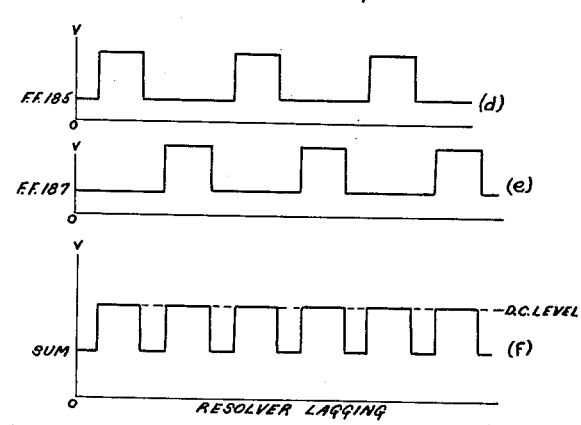
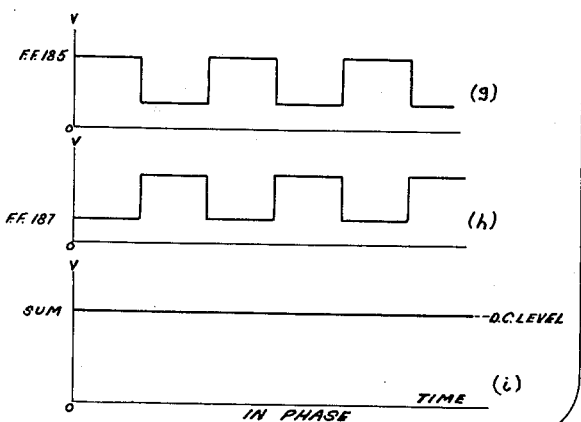
Inventor
Paul Harry McGarrell Feb. 26, 1963 P. H. McGARRELL 3,079,522
AUTOMATIC MACHINE TOOL CONTROL
Filed March 31, 1958 12 Sheets-Sheet 12

Inventor
Paul Harry McGarrell
By Hill, Sherman, Meroni, Gross & Simpson Attys

# United States Patent Office 3,079,522
Patented Feb. 26, 1963

3,079,522
AUTOMATIC MACHINE TOOL CONTROL
Paul Harry McGarrell, South Euclid, Ohio, assignor to Thompson Ramo Wooldridge Inc., a corporation of Ohio
Filed Mar. 31, 1958, Ser. No. 725,414
15 Claims. (Cl. 318—162)

This invention relates to data processing equipment. More particularly, this invention relates to digital data processing equipment adapted, for example, to control the operation of a machine tool, such as a milling machine, so as to automatically produce a desired machined product in accordance with a predetermined digitally coded numerical input program.

Many systems have in recent years been devised for the automatic control of machine tools of the type which were originally controlled by a human operator to produce a desired product. In general, such systems are based upon the use of a coded program which has been previously derived by using a generaal purpose digital computer to determine the steps necessary to be executed by a given machine in order to produce a particular desired product. This program is then stored on a paper tape or other storage medium in a code adapted to the requirements determined by the structure of the particular control system and of the particular machine being controlled. The stored program is then fed to a director which converts the program information into electrical signals suitable for controlling a servo-mechanism or other control apparatus to operate the machine tool in accordance with the instructions or commands contained in the coded program.

Most such systems have in the past used a digital servo-mechanism rather than the simpler and less expensive analogue servo-mechanism. This choice has been largely governed by the fact that known directors provide a digital output which must be converted to analogue form if an analogue servo is to be used. In practice, both the director and the converter have been extremely expensive, complex, large, and delicate equipments. Therefore, when an analogue servo was used it has been common practice, as a matter of economic necessity, not to apply the electrical output signal of the director directly to the analogue servo-mechanism operating a machine on a factory floor, but rather to record this output signal on a storage medium such as magnetic tape. A single computer, director and converter combination at a remote location may thus be used to produce magnetic tapes which, in turn, are used in conjunction with a suitable tape play-back mechanism to provide an output to control the servo-mechanism in direct proximity to the machine tool on the factory floor.

The procedure of interposing a magnetic tape between the director output and the servo-mechanism input, however, has a number of disadvantages. First of all, the tape recording and play-back equipment adds additional expense to the system. Secondly, if the magnetic tape is stopped by a human machine operator, there is no continuing output to hold the machine tool in position and the continuity of the program is lost. Similarly, the speed at which the machine tool is programmed to operate is normally fixed and can not be changed to allow for differences in hardness of the material being cut or for differences in cutting tools used in different operations. Furthermore, the use of magnetic tape leads to an inherent inflexibility in that other functions performed by the director are not under the control of the human operator while the machine tool is in operation. In spite of these difficulties, magnetic tape has, in the past, been necessary since directors for processing the program output data of the computer have been so expensive, so complex and so delicate, as not to be practical for use immediately adjacent to the controlled machine tool in the dirt, vibration and varying ambient temperatures and humidities normally encountered on a factory floor.

It is, therefore, an object of this invention to provide a director for an automatic machine tool control system which itself provides an analogue output signal from digital input data and which utilizes electrical logic circuitry which is simple, efficient, and adaptable to complete implementation by transistors or other similar small, rugged active devices and logical elements so that the director may, in practice, be placed directly on the factory floor adjacent to the controlled machine tool and operated as a unit therewith.

It is a further object of this invention to provide a director for an automatic machine tool control system which is adapted to convert digitally encoded input data into a phase modulated output signal suitable for directly operating an analogue servo-mechanism controlling a machine.

It is yet another object of this invention to provide a director for a machine control system which will provide a continuing output signal of fixed value so as to hold the machine in position when the input program is stopped.

It is a further object of this invention to provide a director which is adapted to automatically execute a program which specifies one of a plurality of operating speeds for each command and to provide in the director manually adjustable means for modifying the program specified operating speeds.

It is still a further object of this invention to provide such a director having improved and simplified logic circuitry which may be implemented through the use of standard commercially available transistorized "plug in" modules any one of which can be readily replaced so as to facilitate maintenance and insure maximum reliability of system operation.

It is yet another object of this invention to provide such a director wherein the registers storing the data in the director each utilize the same easily read binary-decimal code as is used to encode information on the input tape so that the particular channel in which any error or defect in operation may occur will be readily and easily apparent to an operator monitoring these registers from a control panel.

It is a still further object of this invention to provide a director which can be economically manufactured at a cost competitive with the cost of the magnetic tape equipment alone required in presently used systems.

It is yet another object of this invention to provide for such a director, circuitry utilizing a particular binary-decimal code which leads to simplification of the circuitry required to convert a digitally encoded number into a train of pulses equal in number to the magnitude of the coded number and occurring substantially uniformly over a specified time interval so as to perform a linear interpolation between commands.

It is a further object of this invention to provide improved circuitry for digitally phase modulating a standard reference rectangular wave by means of a train of pulses of predetermined number occurring in a predetermined time interval.

It is another object of this invention to provide apparatus for generating a predetermined number of pulses in a predetermined interval of time in accordance with stored information.

It is a further object of this invention to provide improved electrical circuitry for synchronizing each of a train of randomly occurring pulses with one of a train of pulses of fixed frequency.

Briefly, in accordance with one aspect of the present invention, a paper tape reader, a director, analogue servo-mechanisms and a control console, are placed immediately adjacent to a machine tool to be controlled on a factory floor, there being one servo for each axis of motion of the controlled machine. In normal operation, a program which has previously been derived from a computer or by other means, is encoded on a paper tape which is read by the tape reader, the output of which is supplied to the director. The director, which is preferably a fully transistorized unit, converts the digitally encoded information derived from the tape reader to phase modulated output signals which are applied to phase demodulators or detectors forming the input stage of each servo system. The phase detectors derive unidirectional voltages which drive servo-amplifiers which, in turn, operate hydraulic valves controlling rams or other mechanisms controlling the operation of the machine. Although the operation of these components is normally fully automatic, each of these components may, in accordance with the present invention, also be manually controlled in some or all of their functions by an operator seated at a control console to which each of the foregoing components are electrically connected. The human intelligence of the operator may thus be interposed to modify the automatic operation of the machine when this is desirable since the arrangement of the equipment is such that the operator has all of the foregoing components within his immediate filed of view and under his control.

While the novel and distinctive features of the invention are particularly pointed out in the appended claims, a more expository treatment of the invention, in principal and in detail, together with additional objects and advantages thereof, is afforded by the following description and accompanying drawings in which like reference characters are used to refer to like parts throughout and wherein:

FIGURE 3 is a diagrammatic view showing the format of the information encoded on the paper tape controlling the system of FIG. 1.

FIGURE 4 is a chart showing a preferred tape coding for the system.

FIGURE 11 is a detailed block diagram of a servo system suitable for use in the system of FIG. 1.

FIGURE 12 is a detailed block diagram of a modification of the director shown in FIG. 5.

FIGURE 13 is a detailed block diagram of the synchronizer shown in FIG. 12.

FIGURE 14 is a detailed block diagram of the phase demodulator used in the analogue servo systems.

FIGURES 15, 16 and 17 are volt-time wave-form diagrams illustrating the operation of the circuit of FIG. 14.

Figure 1:
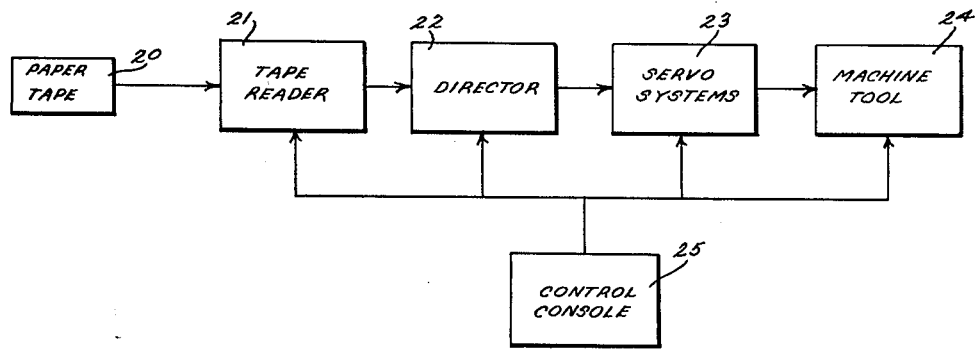
FIGURE 1 is a block diagram of an automatic machine tool control system.

Turning now to the drawings, there is shown in FIG. 1 a block diagram of an automatic machine tool control system in which a punched paper tape 20 is fed to a tape reader 21 to control a director 22 which controls servo systems 23 connected to a machine tool 24. Various controls for the machine may be mounted in a control console 25 which is preferably physically positioned adjacent the machine tool 24, as shown in the perspective view of FIGURE 18. The illustrated machine tool 24 may be a milling machine having four types of movements $x$, $y$, $z$ and $b$, such as is shown in simplified or diagrammatic manner in FIG. 2. The various circuits and components of the director 22 and also the tape reader 21 may preferably be mounted within the housing of the console 25. The punched paper tape 20 contains in coded form, a program defining a sequence of operations to be performed by the controlled machine in order to produce a particular desired product. Tape reader 21 senses the information encoded in the punched tape and converts this information to electrical impulses corresponding to the punched holes. The tape reader, which may for example be a commercially available photoelectric tape reader, reads the tape one digit at a time. Since the reader is not provided with storage faiclities to accumulate the information derived from the tape, it delivers the information, one digit at a time, to the director 22. The director, which will be described in greater detail below, is provided with both intermediate and final storage facilities, and first starts the tape reader to accumulate an entire command in intermediate storage. When one command has been executed, the previously read command is transferred from intermediate to final storage.

Figure 2:
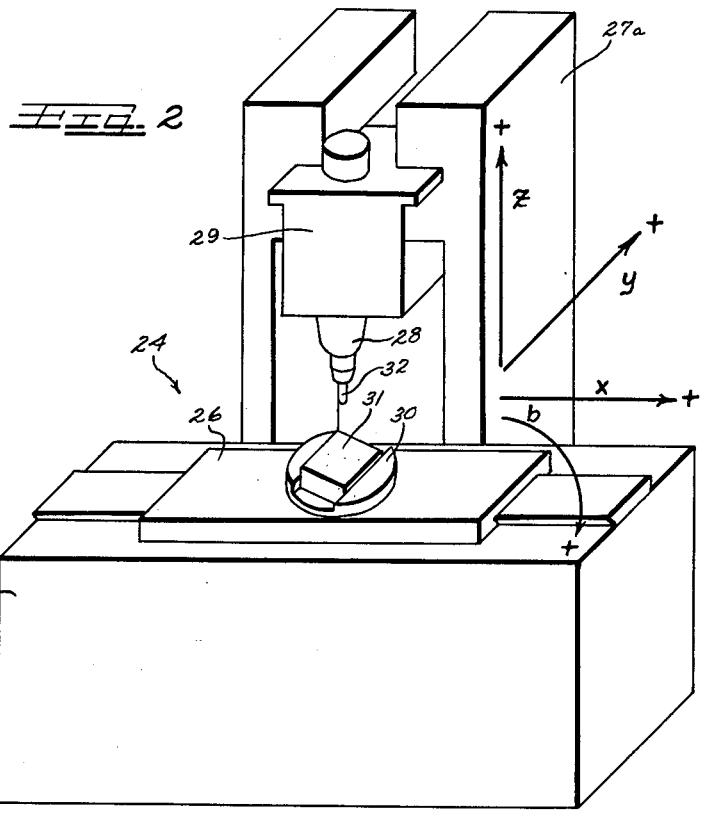
FIGURE 2 is a simplified perspective view of a milling machine showing diagrammatically the axes of the controlled motions of the machine.

A command may conveniently consist of twenty-five digits there being six digits in each of the signed numbers $x$, $y$, $z$ and $b$ which specify the magnitude of the motion along the plus or minus direction of one of the axes $x$, $y$, $z$ or $b$ shown in FIG. 2 and one digit specifying the length of time in which such motions is to take place. When one command has been read and accumulated in intermediate storage, the tape is instantaneously stopped. While one command is being read into intermediate storage, the director simultaneously starts to convert the previously read command which has been transferred in parallel from intermediate storage to final storage, into four separate pulse trains, one to control each axis of motion. The number of pulses in each train is determined by the corresponding number $x$, $y$, $z$ or $b$, in final storage. The time duration or interval for each pulse train is, however, the same and is determined separately for each command by the clock cycle time encoded as the twenty-fifth character of each command on the tape. Each of the pulse trains is then directed into one of eight channels, dependent on the sign of the respective number controlling the pulse train for $x$, $y$, $z$ and $b$, respectively, and is used to phase modulate one of four fixed frequency rectangular wave outputs, to a degree proportional to the number of pulses in the train, the novel phase modulator used thus itself serves as a digital to analogue converter.

Since the director is such as to be suitable for on-line operation, its output signals are applied directly to the analogue servo-systems or other actuating means or control apparatus controlling the operation of the machine tool. The phase modulated outputs for the $x$, $y$, $z$ and $b$ channels, respectively, are each applied to a phase demodulator which is the input stage of each of four analogue servo-systems 23 controlling the machine tool 24. Each servo-system is, of course, also supplied an unmodulated output which may be used as a reference so that the servo can determine the degree of phase modulation for each channel and drive the machine a distance along each of its four axes which is proportional to this phase modulation. The degree of phase modulation is, of course, in turn determined by the program numbers encoded on the tape.

At the end of the clock cycle time associatted with the command in final storage, the command will have been converted and the machine operation called for will have been executed. Final storage is then automatically reset to zero, the contents of intermediate storage (the command which was read in while the first command was being converted from final storage) is transferred from intermediate storage to final storage and the intermediate storage register is reset. The tape reader is then started again to read the next command into intermediate storage while the command just transferred to final storage is being converted and executed. Thus the director assimilates and converts the information read sequentially and incrementally from the tape and provides an output suitable for controlling a plurality of servosystems to operate the machine tool in a continuous manner if desired. However, the program tape may, if desired, also call for stopping the operation of the machine as will be explained in detail below. Furthermore, each of the units shown in FIG. 1, tape reader 21, director 22, servo-systems 23, and machine tool 24, are connected to be manually controlled (as for initiating operation, resetting, etc.), from a control console 25 in a manner also to be described in greater detail below.

It should be noted here, however, that in the present system the director is preferably an all transistorized unit which is sufficiently small and rugged to be used on a factory floor immediately adjacent one or more machine tools being controlled. Of course, the output of the director could be recorded on magnetic tape and this tape then used to control the machine tool as has been the practice in the past. However, the director of the present invention can be manufactured at a cost competititve with the cost of the tape play-back equipment required for this procedure and, as noted above, is rugged enough to operate in the presence of factory dirt, vibration and varying ambient temperature and humidity. It is, therefore, preferred to position all of the units shown in FIG. 1 in close physical proximity on a factory floor, so that an operator seated at the control console can see all other units and monitor the operation of the entire system. Of course, it will also be understood, however, that a plurality of similar machine tools executing the same program can be operated in parallel from a single director under the control of a single operator.

In FIG. 2 the appropriately labeled arrows diagrammatically illustrate the axes of motion, $x$, $y$, $z$, and $b$, of a machine 24 controlled by the numbers $x$, $y$, $z$ and $b$ read from the tape. In practice the controlled machine may, for example, be a commercially available milling machine such as the Cincinnati Milling Machine Company's Hydrotel model 30 x 16 milling machine which has been provided with four hydraulic valves operated by the servo-systems 23 to drive rams or other mechanisms which cause the relative motion between the work piece 31 and the cutting tool 32 along the four axes $x$, $y$, $z$ and $b$, respectively. The hydraulic valves and the rams or other actuating mechanism may be of any convenient conventional construction and not shown in detail since many such are known in the art. Thus, the table 26 of the machine 24 moves with respect to the fixed frame 27 and cutting tool 32 of the machine and carries the work holder 30 and work piece 31 with it along the longitudinal axis as indicatetd by the arrow $x$. Work holder 30 is in turn mounted for rotary motion in a plane perpendicular to table 26 and about a horizontal axis fixed with respect to table 24 as indicated by the arrow $b$. Cutting tool 32 is mounted in a vertically movable holder 28 which is, in turn, mounted in a transversely movable member 29. Member 29 is mounted for transverse motion (along the axis) in a fixed upright portion 27a of frame 27. Cutting tool 32 may thus be actuated for both vertical and transverse motion with respect to table 26 and work piece 31 as indicated by the arrows $y$ and $z$, respectively. When power is applied to operate cutting tool 32, the cutting point may be brought into contact with work piece 31 by means of manual controls to be described below. Thereafter, the relative motion between work piece 31 and cutting tool 30, made up of components of motion along some or all of the four axes, $x$, $y$, $z$, and $b$, determines the shape to which work piece 31 will be cut. Of course, it will be understood that the milling machine shown in FIG. 2 is merely part of a preferred illustrative embodiment of the system and that other machines and/or other axes of motion could be controlled by the data processing equipment of the present invention.

In order to facilitate a detailed explanation of the structure and operation of the preferred embodiment of the invention shown in the drawings, a set of particular quantitative values will be given and used in tracing through the execution of a command by the system. While the circuit structure of the system is related to the logic of the coding to be described, it should be understood that both the particular coding and the quantitative values to which the system is calibrated are merely illustrative of a presently preferred embodiment and could readily be varied in accordance with the needs of a particular application as will be apparent to those skilled in the art.

In FIG. 3 there is diagrammatically shown the general format of the twenty-five characters in a single command digitally encoded in a single block of information on the paper tape 20 which is fed to tape reader 21. The chart of FIG. 4 shows the particular coding used to encode any desired character. For the purposes of this specification the term "character" will be used synonymously with the term "digit" and shall be understood to mean any single letter, symbol, or decimal digit. In the present apparatus a 1—1—2—5 binary-decimal code is used wherein each decimal digit is represented as the sum of four weighted binary "bits." The term "bit" or "binary bit" is, in conformity with general usage, herein used to mean a single binary number, that is, a one or a zero. In pure binary notation, of course, each binary bit implies a weight multiplier or coefficient which is some power of two, the power depending on the position of the bit in the binary number. Similarly in pure decimal notatiton each digit implies a coefficient which is some power of ten, the power depending on the position of the digit. Thus, the three digit decimal number 237 may be explicitly written as $(2 \times 10^2 + 3 \times 10^1 + 7 \times 10^0)$.

In the 1—1—2—5 binary-decimal code used, this same decimal system is used, but each digit is expressed as a binary number wherein the weights or implied coefficients of each bit are not ascending powers of two as in pure binary, but rather the decimal numbers 1, 1, 2 and 5.

In FIG. 3 it will be noted that tape 20 may conveniently have eight parallel channels arranged longitudinally of the tape and respectively labeled 1, 1″, 2 feed holes, 5, CK, O and X. The above mentioned four binary bits representing any given digit or character are arranged transversely of the tape, one bit in each of the channels 1, 1′, 2 and 5, whereas the sequence of digits in a decimal number is arranged longitudinally of the tape as shown. On the tape, the presence of a hole in a given position of a particular channel is used to indicate a binary one for that bit, whereas the absence of a hole indicates a binary zero. It will be noted that only four of the available eight channels on the tape are used in the binary-decimal code referred to above. One of the remaining four channels contains the tape feed holes which feed the tape over a sprocket in the reader of the other three channels either the X or the O channel may be used to encode a program stop command in a manner to be indicated below while the remaining channels may, if desired, be used in a more elaborate code to control a tape encoding machine, such as the Friden "Flexowriter" which may conveniently be used to prepare and check the punched tape 20 from computed data. It will be understood, however, that only the format of FIG. 3 and coding of FIG. 4 are pertinent to the present invention.

It will be noted from FIG. 3 that the first digit of the twenty-five digit command in a block to be read by the tape reader is labeled "sign $x$." That is, this digit indicates whether the component of motion to be executed along the $x$ axis shown in FIG. 2 is to take place in the plus or minus $x$ direction. By reference to the detailed coding given in the chart of FIG. 4 it will be seen that so far as the 5, 2, 1' and 1 channels are concerned, a plus sign is coded as 0110 (holes punched in channels 2 and 1' only) and a minus sign is coded as 0010 (hole in channel 1' only). These sign characters thus differ by only a single bit in one channel, channel 2, and only this single channel need be read. Hence, so far as storage requirements are concerned, only one bit rather than the usual four bit provision per character need be made for the four sign characters in each command. The twenty-five digit command will thus consist of eighty-eight bits. The second digit to be read is the ten thousands digit of the number specifying the magnitude of the motion to be executed along the $x$ axis. The other four digits of this five digit decimal number follow immediately in sequence. Each decimal digit is, of course, encoded on the tape in four-bit binary code in a manner shown in detail in the chart of FIG. 4. Thus a decimal 1 is written 0001; 2, 0100; 3, 0101; 4, 0111; 5, 1000; 6, 1001; 7, 1100; 8, 1101; and 9, 1111. For the sake of clarity it should be pointed out that this representation of 9, for example, may be explicitly written as $$(1 \times 5 + 1 \times 2 + 1 \times 1 + 1 \times 1)$$

It will thus be seen that the coded representation of each decimal digit is a simple one which can be quickly read visually by an operator either directly from the tape or on banks of neon lights on the control panel representing the contents of the various registers of the director which are all arranged in the same coding pattern for ease and simplicity of operation, monitoring and maintenance.

Returning to FIG. 3 it will be noted that the first six digits read by the tape reader are the sign and the five digits of the number indicating the motion required in the $x$ direction. The units of magnitude of motion represented by this number may conveniently be ten thousandths of an inch. Thus, the largest motion which a single command can call for in either the plus or minus $x$ direction is 9.9999 inches. The next six digits to be read, digits 7 through 12 on FIG. 3, are similarly the binary coded representation of the signed magnitude of the motion required in the $y$ direction. Similarly, digits 13 through 18 specify the signed magnitude of the motion required in the $z$ direction, and digits 19 through 24 specify the signed magnitude of the rotary motion required in the $b$ direction. The units of the $b$ number may, for example, conveniently be hundredths of a degree of rotation with clockwise rotation being taken as positive as indicated in FIG. 2. Thus, the largest rotation which a single command could call for would be 999.99 degrees.

The last or twenty-fifth digit of the command or block to be read is one of the letters A through J which is used as a clock cycle code to indicate the length of time during which the machine tool is to simultaneously execute the four motions having magnitudes and directions specified by the $x$, $y$, $z$ and $b$ numbers. That is to say, each of these four motions is to take place simultaneously and at such a rate that each will be completed at the end of a time interval having a length specified by the clock cycle code letter. The binary-decimal coding for these letters A through J is shown at the beginning of the chart of FIG. 4 and will not be repeated here. The length of time corresponding to each clock cycle code letter is given in the chart below.

| Clock Cycle Tape Code | Clock Cycle Time (seconds) | Clock Cycle Tape Code | Clock Cycle Time (seconds) |
|---|---|---|---|
| A | ½ | F | 20 |
| B | 1 | G | 40 |
| C | 2 | H | 80 |
| D | 5 | I | 160 |
| E | 10 | J | 320 |

It is thus apparent that the machine may be programmed to complete the motions called for in any one command during a time interval having, for example, any one of the above ten lengths in seconds. The logic of the electrical circuitry of the director is such as to effectively perform a linear interpolation in taking the machine from the point it was left at by the last command to the point called for by the increment of motion specified in the command being executed. Thus, if $x$ only is specified and $y$, $z$ and $b$ are zero for a given command, for example, the machine will not only move in a straight line along the $x$ axis but also will move at a substantially uniform rate so as to complete the required $x$ distance at the end of the time specified by the clock cycle code letter. The detailed manner in which this interpolation is accomplished will be described below. It is, however, mentioned here in order to point out that in the operation of the machine any given curve or curved surface is approximated by a series of straight-line or rotary component motions. Of course, the smaller the distance traveled during each command, that is, the smaller each straight line segment or circular arc $b$ of the approximation is, the better the approximation can be. It is, of course, assumed that the detailed program of motions necessary to cut any desired surface to any specified tolerance will have been computed beforehand as by the use of a general purpose digital computer. The results of these computations are encoded on the paper tape 20, in any convenient manner as, for example, by use of a "Flexowriter." Thus, in use, a library of reproducible paper tape programs may be built up and kept on hand ready to feed to the tape reader and director in order to produce any desired item. The computational techniques used to compute a program to be stored on the paper tape are well known in the art and do not form a part of the present invention.

Figure 5:
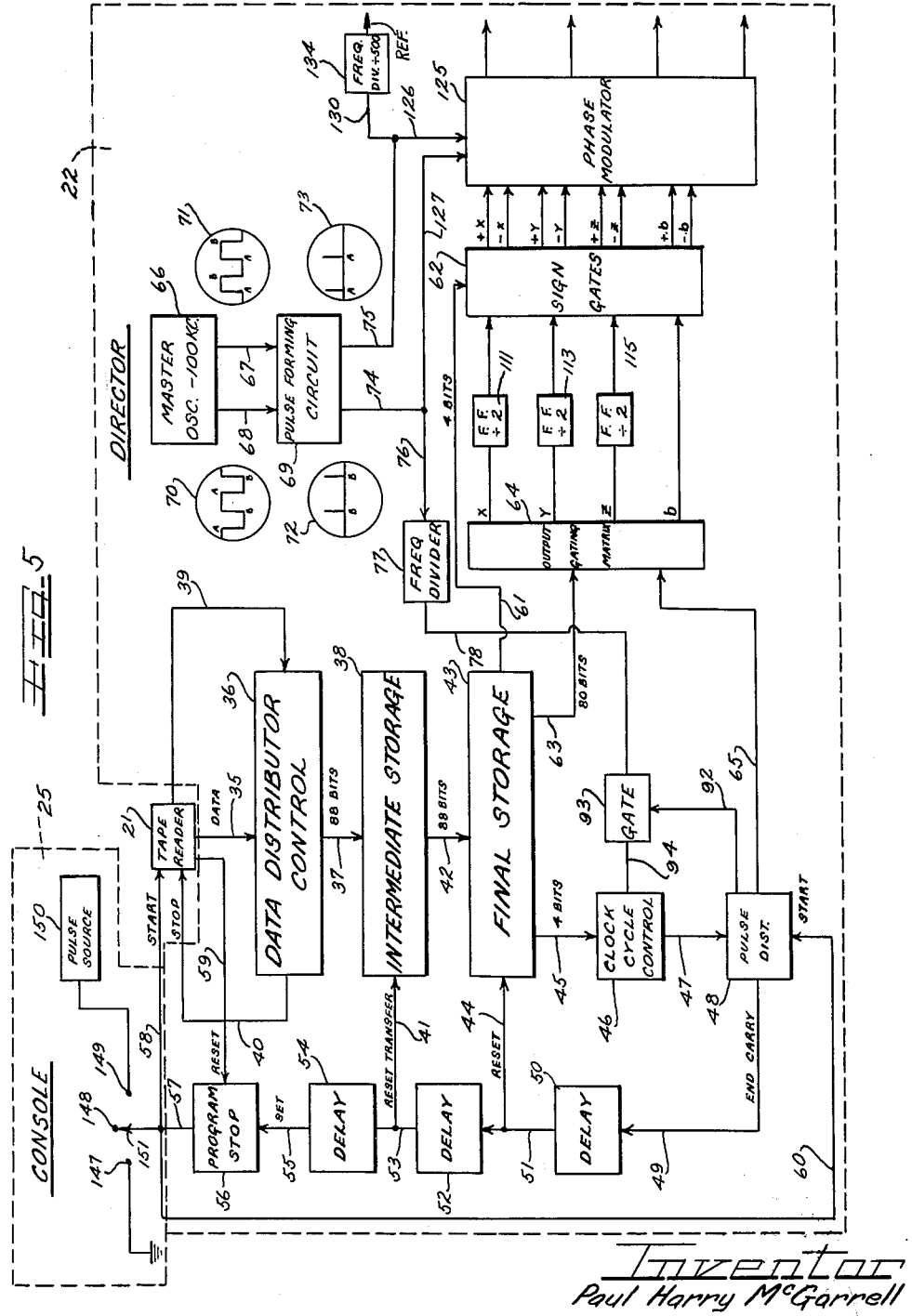
FIGURE 5 is a more detailed block diagram of one embodiment of the director shown in FIG. 1.

This stored program, encoded on tape 20 in the manner discussed above, is sensed by the tape reader 21 and converted to an electrical output in which a binary one (corresponding to a hole in the tape) is represented by the presence of a pulse on a given channel at a predetermined point in time and a binary zero (corresponding to the absence of a hole at a given point on the tape) is represented by the absence of a pulse at the corresponding predetermined point in time. This output is applied to director 22 over cable 35 as shown in FIG. 5 which is a more detailed block diagram of one embodiment of the director 22. In the embodiment of FIG. 5 no provision is made for manually varying the clock cycle time specified in the commands of the program. A modification of the director of FIG. 5 in which such provision for varying programmed time is made is shown in FIG. 12 which will be discussed in detail below. It should be noted here, however, that the two embodiments have many features in common and that like reference characters have been used to indicate like parts in the two embodiments.

In both embodiments, all of the binary bits in a single digit or character on tape 20 are sensed simultaneously by tape reader 21. Hence, cable 35, though shown as a single line, will, of course, be understood to include one channel for each of the bits so sensed. This output from tape reader 21 is applied over line 35 to a data distributor control unit 36, the output from which is in turn applied over a plural channel cable 37 to the intermediate storage unit 38. Again, assuming the exemplary quantitative set of values mentioned above, the data distributor and intermediate storage must have the following characteristics and act as a pair to perform the following functions. First, they must accept and store information from the tape reader. The data distributor must route each of the twenty-five characters to a separate storage slot such as an individual register in intermediate storage. The tape reader must be stopped after a block of information has been read. The intermediate storage circuitry must be such that a complete block can be transferred in parallel from intermediate storage to final storage on a pulse command, preferably in less than 50 microseconds. Overall, the data distributor and intermediate storage must be such that a complete block can be read and be ready for transfer to final storage so that the apparatus is ready to start to read another block in less than one half second, that is the smallest clock cycle time used.

In practice, the pulse distributor may, for example, consist of two cascaded ring counters each of which counts up to 5 and which together, therefore, count up to 25, that is, up to the number of characters in a complete block. This counter is driven by pulses generated by each separate incremental motion of the sprocket wheel of tape reader 21. These pulses are applied to the pulse distributor counters over line 39. The counter, in turn, controls 21 sets of four gates each and four sets of one gate each so as to enable or open one set of gates for each particular count. The one bit sign characters are of course fed through the associated single gates whereas the numeric digits and time letters are each fed through its associated four gate set. The output of each set of gates is fed to one of twenty-five sets of flip-flops or bistable circuits, each set forming an individual slot or register in the intermediate storage unit 38. Twenty-one of these registers have four flip-flops each to accommodate four bit digits whereas four of the registers are each single flip-flops to store the sign bits. The memory thus stores a total of 88 bits.

In operation, the first of the twenty-five sets of gates is enabled or opened while the tape reader is reading the first digit. Since the output of this set of gates is connected to the first register in intermediate storage, the first character is thus routed to the proper slot. This process is then repeated for each of the succeeding twenty-four characters. At the end of one block, the counter having reached a count of twenty-five, emits a pulse over line 40, which is applied to the tape reader 21 to stop the reading process.

The ring counters and gates forming the circuitry for data distributor 36 and the bi-stable circuits or flip-flop registers used in intermediate storage 38 may, of course, be of any suitable well known design so far as the individual stages are concerned. It is, however, preferred to form these stages from plug-in modules consisting of solid state components such as transistors, diodes, etc. mounted on a printed circuit board which is supplied with appropriate terminals. Such basic modules are commercially available, for example, from the Computor Control Company, Inc., Wellesley, Mass., and are fully described in their various catalogues including, for example, Catalog M. Since these and other equivalent basic stage circuits for performing the functions hereinabove described are well known in the art, they will not be described in further detail.

When one complete command has been executed, a pulse distributor 48, to be described in detail below, emits a pulse over line 49 which is applied to a delay element 50 and thence through lines 51 to 44 to final storage 43 to reset the bistable circuits of final storage 43. The term "reset" is, of course, here used to mean that each of the bistable circuits in final storage 43 is returned to its zero indicating condition. The term "set" will similarly be used to indicate that a bistable circuit is placed in its one representing condition. Which of the two stable states of any particular bistable device is chosen to represent a one or a zero and the exact connection required are matters of convenience and convention which will be obvious to those skilled in the art.

The reset pulse on line 51 is also applied through a second delay element 52 and lines 53 and 41 to intermediate storage element 38. The pulse is so applied to intermediate storage 38 as to cause the parallel transfer of the contents of intermediate storage 38 to final storage 43 through line or cable 42 thus leaving intermediate storage 38 in the reset or all zero condition ready to have a new command read into it from tape reader 21 and data distributor 36. The reset pulse is further applied through a third delay element 54 and a line 55 to a program stop flip-flop 56 which will have been placed in the reset condition by a pulse emitted from tape reader 21 over line 59 when the tape reader was stopped after reading the previous command if that command did not contain a program stop code. The program stop coding and operation will be described in detail below. The pulse applied to flip-flop 56 over line 55 is therefore a setting pulse or one applied so as to normally change the state of the flip-flop from its reset or zero representing to its one representing condition. Output is taken from flip-flop 56 so that only a change from reset to set condition results in a pulse output which is applied over lines 57 and 58 to start tape reader 21 and cause it to read the next command into intermediate storage through the data distributor. The output pulse from flip-flop 56 which is applied over line 58 to start the tape reader 21 is also simultaneously applied over line 60 to start pulse distributor 48 which simultaneously initiates the process of converting and executing the previous command now stored in final storage 43.

It is apparent that delay elements 50, 52, 54 and flip-flop 56 provide between cycle timing. Delay 52 should provide ample time for resetting of final storage before the end of this delay signals for a reset and transfer of intermediate storage into final storage. Delay 54, initiated at the end of delay 52, allows intermediate storage to be reset and transferred before flip-flop 56 is set to again start the tape reader. The sum of delays 52 and 54 should preferably not exceed 100 micro-seconds. In practice, these delays may be one-shot multivibrators of the type which are also commercially available as transistorized plug-in packages, from the above noted source. Of course, flip-flop 56 is also such a commercially available module.

The structure of final storage unit 43 is quite similar to that of the intermediate storage 38 in that it also consists of twenty-five individual registers composed of bistable circuits or flip-flops providing storage facilities for a total of 88 bits. The four bits comprising the clock-cycle code letter are stored in one such register, the output from which is applied over a cable 45 to control a clock cycle control unit 46 which, in turn, has an output applied over cable 47 to the pulse distributor 48 as will be described in greater detail below. As noted above, the sign of each of the numbers $x$, $y$, $z$, and $b$ can be determined from a single bit. These four individual bits are stored in separate registers. Zero indicating and one indicating outputs from each such sign register are applied over an eight channel cable 61 to control eight sign gates indicated by element 62 in a manner and for a purpose which will be described in detail below. The remaining 80 bits, comprising four bits for each of the five digits of each of the four numbers, $x$, $y$, $z$, and $b$, are stored in twenty separate 4-bit registers, the outputs from which are applied over line 63 to output gating matrix 64 so as to control the output applied from pulse distributor 48 over line 65 to the matrix in a manner to be described below. It should be noted that the intermediate and final storage units each provide for parallel read-in and parallel read-out from each of their respective registers. The data distributor control 36 provides a sequential or serial read-in as between different registers within intermediate storage, but the basis storage circuitry within both intermediate and final storage is parallel in both input and output.

A further input to the clock cycle control 46 and pulse distributor 48 is derived from a master oscillator 66 which may, for example, be a free running multivibrator connected to provide a square wave output having a frequency of 100 kilocycles. This output is applied over leads 67 and 68 to pulse forming circuits 69 which differentiate the rectangular wave output in order to derive spiked pulses at the leading and trailing edges of each rectangular pulse. In practice, this may most conveniently be accomplished by deriving a rectangular wave output over line 68 which is 180 degrees out of phase with the output derived over line 67 as illustrated in FIG. 5 in the wave form inserts 70 and 71, respectively. Pulse forming circuits 69 then differentiate the leading edge of each of these wave forms to derive pulse outputs as shown in FIG. 5 in the wave form inserts 72 and 73, respectively. Thus, the point "A" in wave form 71 coincides with pulse A in waveform B and similarly point "B" in wave form 70 coincides with pulse "B" in wave form 72. By differentiating the leading edge of these out-of-phase wave forms, pulse forming circuit 69 provides one output over line 74 which consists of the "B" pulses illustrated in wave form 72 and a second output over line 75 which consists of the "A" pulses illustrated in wave form 73. It will be apparent that there will be one "A" pulse and one "B" pulse for each cycle of the 100 kilocycle master oscillator output. Each "A" pulse will thus occur ten microseconds after the previous "A" pulse, and each "B" pulse will occur ten microseconds after the previous "B" pulse. Furthermore, each "B" pulse will occur halfway between two successive "A" pulses, that is, five microseconds after the previous "A" pulse.

The "B" pulse output from line 74 is applied over line 76 to a frequency divider 77 which may conveniently be a count down circuit dividing the frequency of the "B" pulses by 5 so as to derive from the 100 kilocycle input a 20 kilocycle output which is applied over line 78 to an input gate 93 and thence over line 94 to the clock cycle control 46. Of course, it will be understood that master oscillator 66 provides the basic timing synchronization for the entire system in a manner which will be described below. This master oscillator is preferably a crystal controlled rectangular wave oscillator or multivibrator which, like the other components of the system, is commercially available as a transistorized module and will not be further described herein. It is also understood, of course, that the stated frequency of 100 k.c. is exemplary only and that any convenient frequency could be used.

It is the function of the clock cycle control 46 and pulse distributor 48 to derive from the 20 kilocycle input applied over line 78 a train of output pulses for each of the four axes of motion, x, y, z, and b, which trains of pulses are applied over output cable 65 through output gating matrix 64 and sign gates 62 to a phase modulator 125. Each of these trains of pulses is initiated by the pulse emitted from program stop flip-flop 56 simultaneously over lines 58 and 60 to start tape reader 21 and to set a flip-flop in pulse distributor 48 which opens gate 93 to start the pulse distributor 48 to convert and execute the previously read command stored in final storage 43. Each of these trains of pulses further has a time duration the length of which is determined by the clock cycle code letter stored in final storage 43 and applied over line 45 to the clock cycle control 46. Each of these trains of pulses further consist of a series of pulses equal in number to the corresponding axes number x, y, z, or b, respectively stored in final storage representing the command to be executed and applied over line 63 to output gating unit 64. At the end of these trains of pulses, pulse distributor 48 emits the pulse over line 49 which is transmitted through delay elements 50, 52 and 54 and, in turn, resets final storage, transfers the previously read command from intermediate to final storage thus resetting intermediate storage, again starts the tape reader in reading the next command and simultaneously restarts the pulse distributor 48 in converting the next command.

Figure 6:
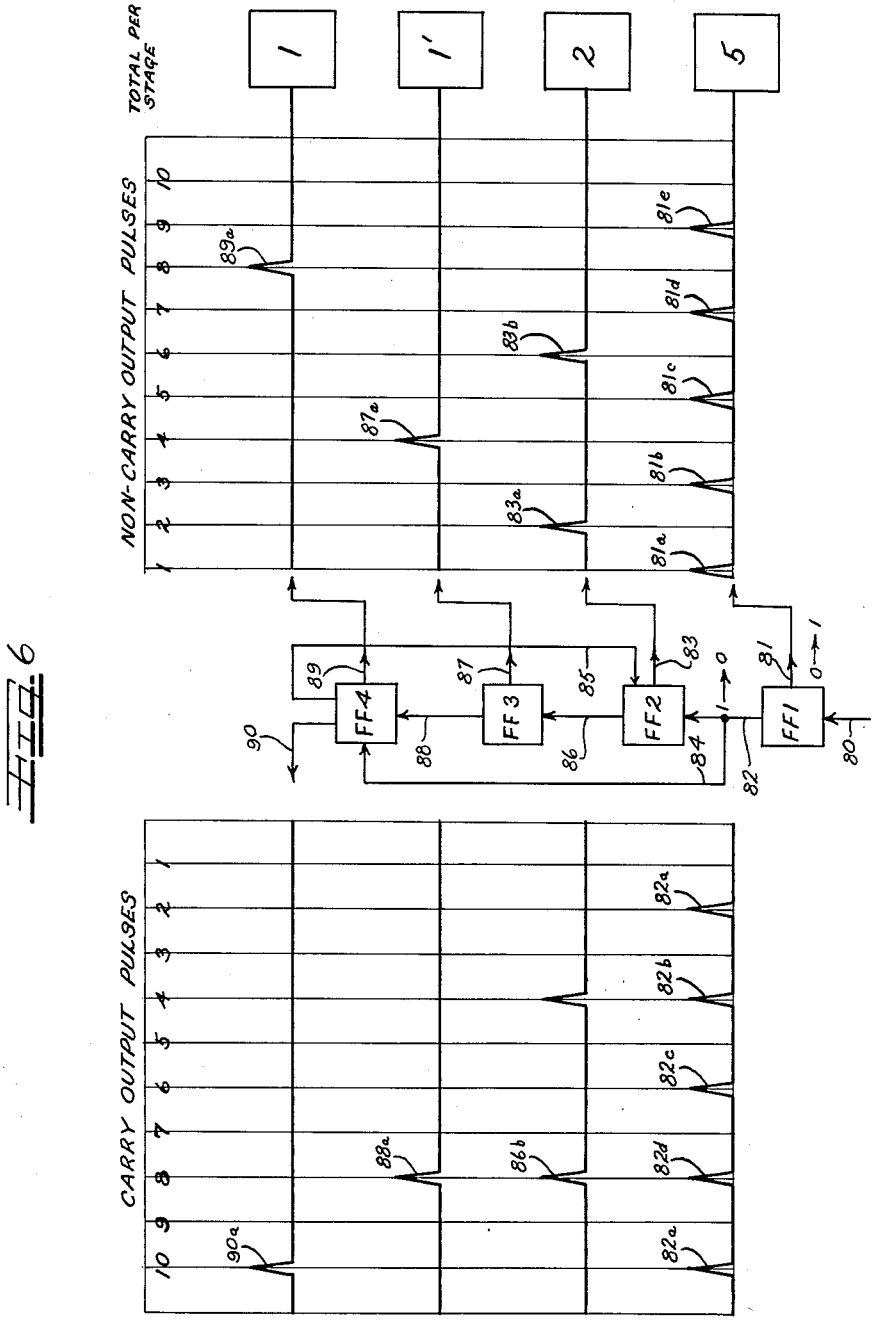
FIGURE 6 is a block diagram of a decade counter of the type used in the system of FIGURE 5 and includes waveform diagrams illustrating the operation thereof.
Figure 7:
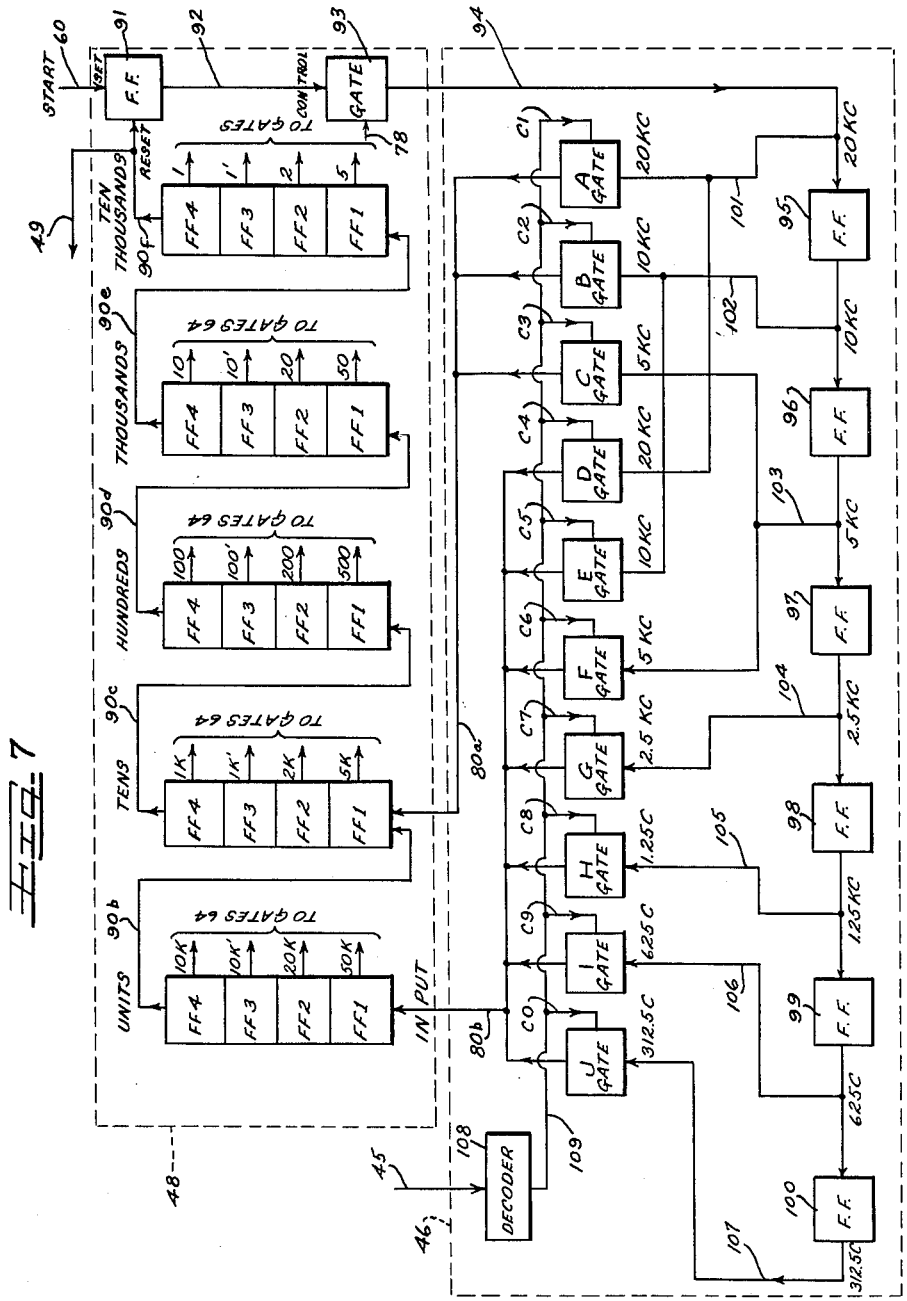
FIGURE 7 is a detailed block diagram of the clock cycle control and of the pulse distributor of the system of FIG. 5.
Figure 8:
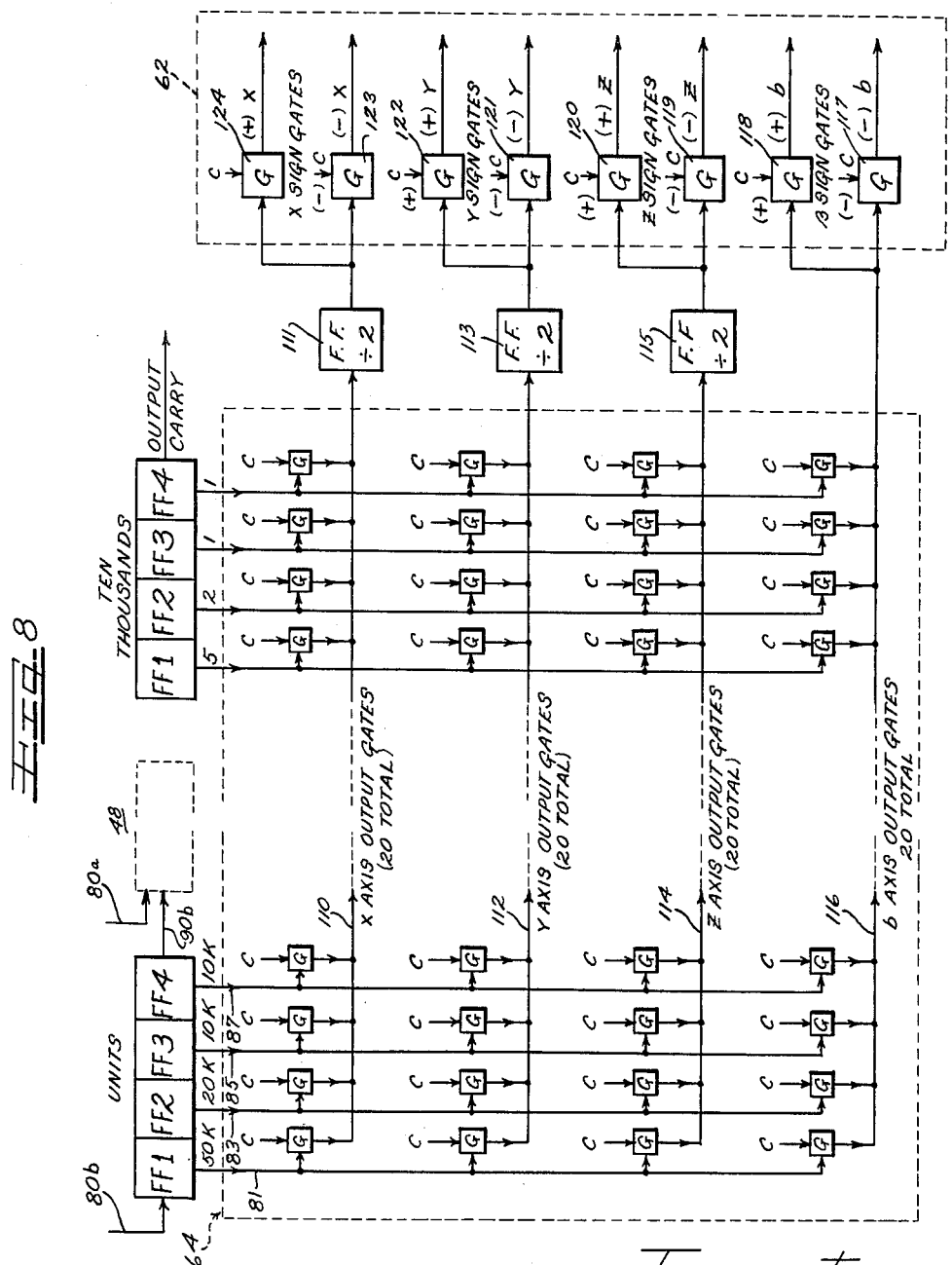
FIGURE 8 is a detailed block diagram of the output gating matrix and of the sign gates of the system of FIG. 5.

The detailed manner in which the clock cycle control 46, the pulse distributor 48, the output gating unit 64, and the sign gates 62 co-act to produce the above noted trains of pulses in accordance with the information stored in final storage 43 may be seen more clearly by reference to FIGURES 6, 7 and 8.

The pulse distributor 48 which is shown in greater detail in the dashed line block 48 of FIG. 7 may, for example, consist of five cascaded decade counters each being of the type shown in greater detail in FIG. 6. Each decade is constructed of four interchangeable plug-in and preferably transistorized module flip-flop or bi-stable circuits, plus the external feed-back connections shown in FIG. 6. These four flip-flops are indicated for each decade counters in FIG. 6 by the blocks FF1, FF2, FF3 and FF4, respectively. Each of these flip-flop circuits, as is well known in the art, has two stable electrical states and may be triggered from one state to the other by an input pulse which may be applied to FF1, for example, over line 80, or, as shown in FIG. 7, over lines 80a and 80b. The binary zero representing state of the flip-flop may be termed its reset condition whereas the binary one representing state of the flip-flop may be termed its set condition. The line 80 is connected to the "binary input terminal" of FF1, whereby this phrase is meant the terminal so connected internally that an applied pulse will change the state of the flip-flop regardless of which of its two states it is in. When FF1 is in the reset or zero representing condition, an input pulse applied over line 80 will flip the circuit to its set condition and in so doing, the circuit will emit what may be termed a non-carry output pulse over line 81. That is to say, line 81 is connected to the "set" output terminal which is a terminal so connected that a pulse appears at it only when the flip-flop is changed from its reset to its set condition. This first output pulse is indicated as pulse 81a in the wave form diagram at the right of FIG. 6 which shows all of the non-carry output pulses emitted from each of the four cascaded flip-flops as the decade counts the input pulses from 1 to 10. When a second input pulse is applied to FF1, over line 80, it returns the FF1 from its set condition to its reset or zero representing condition, and the FF1 emits a carry pulse over line 82. That is to say, line 82 is connected to the "reset" output terminal of FF1 which is a terminal at which a pulse appears only when the flip-flop is changed from its set to its reset condition. This carry pulse is applied to the binary input terminal of FF2 thereby changing its state from reset to set. FF2, since it was changed from a zero representing to a one representing state, emits a non-carry pulse over line 83 which is shown in the wave-form diagram as pulse 83a. The carry pulse emitted by FF1 whenever its state is changed from a one to a zero representing condition is also applied over a line 84 to the reset input terminal of FF4 for a purpose to be described below. By "reset input terminal," of course, is meant the terminal so connected that an applied pulse will change the state of the flip-flop only if it is already in a set condition so that it may be reset. Similarly, the term "set input terminal" will be used herein to mean the terminal so connected that an applied pulse will change the state of the flip-flop only if it is already reset so that it may be set. The carry pulses emitted from FF1 when the second and succeeding even numbered pulses are applied are indicated in the wave-form diagram at the left of FIG. 6 labeled "carry output pulses". It will, of course, be understood that the reset or carry output pulse terminal of FF1 is connected by line 82 to the binary input terminal of FF2, the carry output terminal of FF2 being connected by line 86 to the binary input terminal of FF3, the carry output terminal of FF3 being connected by line 88 to the binary input terminal of FF4 and the reset or carry output terminal of FF4 providing an output along line 90. It will be noted that the term "carry output terminal" is used synonomously with the term "reset output terminal" and that the term "non-carry output terminal" is used synonomously with the term "set output terminal".

The output pulses appearing at non-carry output lines 81, 83, 87 and 89 from the respective flip-flops as a sequence of ten input pulses is applied to line 80 are illustrated in the appropriately labeled wave-form diagram at the right of FIG. 6. Thus, pulses 81a, 81b, 81c, 81d and 81e appear on line 81, pulses 83a and 83b appear on line 83, etc. The output pulses appearing on carry output lines 82, 86, 88 and 90 of the respective flip-flops are similarly illustrated in the appropriate labeled wave form diagram at the left of FIG. 6.

When the entire decade is in its reset condition, all of the flip-flops are in the zero representing state and the decade is ready to begin counting. The first pulse applied, as noted above, changes FF1 to its set state and provides output pulse 81a. The second pulse applied changes FF1 back to its zero or reset state and the carry pulse 82a along line 82 changes FF2 to its set or one state, thereby providing non-carry pulse 83a. The third pulse applied changes FF1 to its one state, thereby providing non-carry output pulse 81b. The fourth pulse applied changes FF1 back to zero, its carry pulse changes FF2 back to zero and its carry pulse, in turn, changes FF3 from zero to one, thereby providing non-carry output pulse 87a. The fifth pulse applied simply changes FF1 to its one state and provides non-carry pulse 81c. The sixth pulse applied changes FF1 from one to zero, thereby providing a carry pulse which changes FF2 from zero to one, hence providing non-carry pulse 83b. The seventh pulse applied simply change FF1 from zero to one, thereby providing non-carry output pulse 81d. At the count of eight, FF1 goes from one to zero, providing carry pulse 82d which is applied over line 82 to the binary input of FF2 and is also applied over line 84 to the reset input terminal of FF4. By reset input terminal, at noted above, is meant the input terminal so connected that an applied pulse will change the state of the flip-flop from one to zero only if the flip-flop is originally in a one state. FF4, however, has already been reset and is in its zero state, therefore neither pulse 82d nor previous carry pulses have any effect on FF4. However, at the count of eight, the pulse 82d on carry line 82, changes FF2 to zero which, in turn, changes FF3 to zero and emits pulse 88a which is applied to the binary input of FF4 to change it to the set or one representing condition and provide non-carry output pulse 89a. At the count of nine, FF1 is simply changed from its zero to its one representing state and provides non-carry output pulse 81e. At the count of ten, FF1 is changed from its one to its zero condition, thereby providing carry output pulse 82e. This output pulse, which is applied over line 84 to FF4, now finds FF4 in its one or set condition and resets FF4 to provide output carry pulse 90a on line 90. The carry pulse 82e which is applied over line 84 to FF4 is, of course, also applied over line 82 to FF2 and would normally change its state from zero to one. However, this action is prevented by applying a signal over line 85 from FF4 to FF2. Line 85 is connected to sense the one representing state of FF4 and to apply a voltage to FF2 such that whenever FF4 is in its one representing, or set state, FF2 will be held in its zero representing state in spite of the application to it of a trigger pulse such as 82e. The detailed circuitry by which this latter action per se is accomplished is well known in the art and need not be further described here.

It is thus seen that the four cascaded flip-flops are connected so that when they are all initially reset to zero by any conventional means not shown and ten input pulses are applied to line 80, the first nine output pulses will change the internal states and produce nine non-carry output pulses, whereas the tenth input pulse will not produce a non-carry pulse but will produce an end-carry output pulse such as pulse 90a at output line 90.

In FIG. 7 five decade counters of the type shown in detail in FIG. 6 are arranged in cascaded relationship. That is to say, the units decade is provided with a carry output pulse line 90b which is connected to the binary input terminal of the tens decade. Thus, after ten pulses have been applied over line 80b from the clock cycle control 46 to the units decade, the units decade at the tenth pulse will emit a pulse over line 90b which is applied as an input to the tens decade. The tens decade is, in turn, provided with a carry output pulse line 90c which connects to the binary input of the hundreds decade. Similarly, lines 90d and 90e connect the hundreds, the thousands and the ten thousands decades in cascade, whereas the ten thousands decade is provided with a carry output pulse line 90f which connects to line 49 for a purpose discussed in connection with FIG. 5.

From the foregoing, it is apparent that when input pulses are applied to line 80b, the units decade will emit a carry pulse in the tenth pulse, the tens decade will emit a carry pulse at the one hundredth pulse, the hundreds decade will emit a carry pulse at the thousandth pulse, the thousands decade will emit a carry pulse at the ten thousandth pulse, and the ten thousands decade will emit a carry pulse at the hundred thousandth pulse. Thus, if for example, the frequency of the input pulses applied to line 80b is 312.5 cycles per second, the end carry pulse emitted from line 90f will be emitted 320 seconds after the first input pulse is applied to the units decade over line 80b. It should also be noted that input line 80a from the clock cycle control is applied as shown in FIG. 7 directly to the trigger input of the tens decade rather than to the units decade. Hence, for pulses applied over line 80a, the pulse distributor counting chain will count to ten thousand rather than to one hundred thousand, as is the case when the input is applied directly to the units of decade over line 80b. For example, if the frequency of the input pulses applied over line 80a is twenty kilocycles per second, the counter will count to ten thousand and the output pulse on line 90f will appear one-half second after the first input pulse is applied. It is the function of the clock cycle control to apply input pulses of the appropriate frequency to the appropriate line 80a or 80b of the pulse distributor counter so that the counter will provide an output pulse over line 49 at the end of the clock cycle time called for by the clock cycle code letter stored in final storage. The precise manner in which the clock cycle control accomplishes this will be described below.

It should first be noted here, however, that while the decade counters of the pulse distributor are counting from one to ten thousand, or from one to one hundred thousand, as the case may be, at a rate determined by the frequency of the input pulses from the clock cycle control, each stage of each decade counter will also provide a non-carry output pulse at the respective terminals 81, 83, 87 and 89 thereof, whenever the particular stage is set or changed from a zero to a one condition as explained in detail above in connection with FIG. 6.

Furthermore, referring to the graphical illustration of the time distribution of these non-carry output pulses shown in FIG. 6, it will be noted that the total number of non-carry output pulses provided by each respective flip-flop of the decade as the decade counts from one through ten is indicated by the numbers in the blocks at the right of FIG. 6 as 1, 1, 2, and 5, respectively. Thus it will be noted that FF1 produces five such non-carry output pulses, FF2 produces two such non-carry output pulses, FF3 produces one such non-carry output pulse and that FF4 also produces one such non-carry output pulse. Furthermore, no non-carry pulse from any given flip-flop is ever time coincident with any other non-carry pulse from any other flip-flop of the same decade and no non-carry pulse from any flip-flop of a given decade is ever time coincident with that decade's final output carry pulse. Since the carry ouput pulse from one decade is the trigger input pulse to the next decade, it follows that as the complete counter goes through a complete count there will be one and only one non-carry output pulse from some stage of some decade for each input trigger pulse counted except the last which produces the final output carry pulse. Furthermore, no two non-carry output pulses will be time coincident. Even more important, these non-carry output pulses will be numerically distributed among the stages of each decade as indicated by the numbers associated with lines 81, 83, 85 and 87 of FIG. 7. That is, during a count of one hundred thousand pulses, FF1 of the units decade produces fifty thousand non-carry output pulses, FF2 twenty thousand, etc. Of course, in the ten thousands decade, FF1 produces only 5 non-carry pulses, FF2 produces 2, FF3 and FF4 one each. The fact that these non-carry output pulses have this particular numerical distribution and the foregoing logical properties is used to instrument the above discussed binary-decimal 1—1—2—5 code.

Thus, the fact that the total of the non-carry output pulses from the flip-flops of a given decade is arranged in the 1—1—2—5 pattern illustrated in the graph of FIG. 6 is the basic reason why the input information is encoded on tape 20 in the 1—1—2—5 binary-decimal code discussed above. It will be seen that the non-carry output line, from each flip-flop or stage of each decade as connected to the input terminals of each of four gates, as illustrated in FIG. 8, and that the control terminals of each of these gates are connected by control lines C to the registers of final storage element 43 in such a manner that the gate connected to any storage element containing a one is enabled or open, whereas a gate connected to any storage element containing a zero is not enabled, or is closed. The output gates are thus effectively connected in a matrix array wherein the non-carry output terminal of one stage of the counter is connected to all of the gates in one column of the matrix and the bits encoding one of the four numbers $x$, $y$, $z$, or $b$ in final storage are respectively connected to successive gates in each respective row of the matrix. Furthermore, it should be noted that the connections for any given number such as X are made in inverse magnitude relation. That is to say, the bits of the ten thousands digit in final storage control the output gates connected to the units decade of the pulse distributor counter, the bits of the thousands digit control the hundreds decade of the counter, etc. Finally, of course, the bits of the ten thousands digit control the units decade of the counter. The open gates will then pass a total number of non-carry output pulses corresponding to the number represented in final storage.

Furthermore, since none of the non-carry output pulses are ever time coincident, the outputs from these gates may be connected to a single line such as one of the lines 110, 112, 114, 116 so that the sum total of pulses appearing on a given line as the decade counter runs through its complete count will be equal to the associated number $x$, $y$, $z$, or $b$ controlling the gates feeding that line by the electrical states of the registers representing the number in the final storage element. Of course, it is necessary to provide a set of four such gates for each of the $x$, $y$, $z$, and $b$ axes for each decade. Thus, the matrix will consist of L rows and $M \times N$ columns, where L is here 4, the number of separate axes of motion M is 4, the number of bits per digit, and N is five, the number of digits per character.

Turning now to FIGURES 5 and 7, it will be noted that output carry line 90$f$ of the last decade of the pulse distributor is connected to the reset input of a flip-flop 91 and that the line 60 to which the pulse which starts tape reader 21 is also applied, is connected to the set input terminal of flip-flop 91. Outputs are, in turn, taken from flip-flop 91 over line 92 to control a gate 93 to which the 20 kilocycle output derived from the master oscillator through divider 77 is applied as an input over line 78. Thus, the pulse emitted from flip-flop 56 which initiates the operation of the tape reader to read a single command also sets flip-flop 91 and thereby enables or opens gate 93 so that the 20 kilocycle signal on line 78 is applied to the clock cycle control over lines 78 and 94. When the cascaded counters of the pulse distributor have completed their counts, the final end carry output pulse which is applied from line 90$f$ to line 49 is also applied to the reset input terminal of flip-flop 91 thus changing its state and thereby closing gate 93 so that the 20 kilocycle signal on line 78 is not applied to the clock cycle control while the apparatus is between cycles, that is, while the output pulse on line 49 applied through the various delay elements is resetting final storage and transferring the previously read command from intermediate storage.

When the next cycle starts, after the above noted delays, gate 93 is again opened and the 20 kilocycle signal is applied over line 94 to a count-down chain of cascaded flip-flops 95, 96, 97, 98, 99 and 100 forming a part of the clock cycle control 46. Each of these flip-flops, of course, has an output the frequency of which is one-half of the frequency of its input since each flip-flop provides one carry output pulse for every two input pulses. The harmonically related signals thus available at the input and outputs of flip-flops 95 through 100, respectively, are applied to a group of ten clock cycle control gates indicated in FIG. 7 as the "A" gate, "B" gate, "C" gate, "D" gate, "E" gate, "F" gate, "G" gate, "H" gate, "I" gate, "J" gate, resp. Thus, the 20 kilocycle input to flip-flop 95 is applied over line 101 to the "A" gate and the "D" gate while the 10 kilocycle output of flip-flop 95 is applied over line 102 to the "B" gate and the "E" gate. The five kilocycle output of flip-flop 96 is applied over line 103 to the "C" gate and the "F" gate. The 2.5 kilocycle output from flip-flop 97 is applied over line 104 to the "G" gate, the 1.25 kilocycle output from flip-flop 98 is applied over line 105 to the "H" gate. The 625 cycle output from flip-flop 99 is applied over line 106 to the "I" gate, and the 312.5 cycle output from flip-flop 100 is applied over line 107 to the "J" gate.

The clock cycle code letter which is associated with each command and which is stored in final storage element 43 for the command being executed, is applied over line 45 to a decoder 108. The output from decoder 108 is applied over a ten channel cable 109, one channel of which is connected to the control terminal of one of the respective clock cycle gates as by control lines C-1, C-2, C-3, C-4, C-5, C-6, C-7, C-8, C-9 and C-0. Thus, if the command in final storage includes the clock cycle tape code letter "A," the inputs to the decoder 108 are so actuated that the output of decoder 108 will supply a signal which holds gate "A" open but which holds all of the other clock cycle gates closed. That is to say, only the one particular clock cycle gate called for by the clock cycle code letter in final storage will be held open during the entire period of execution of the command, while other clock cycle gates are closed. Decoder 108 is essentially nothing more than a binary-decimal to decimal converter and includes circuitry all of which is well known in the art. For example, the decoder may consist of a diode logic network including "and" circuits and "or" circuits. Such a network can be designed by well known techniques of Boolean algebra to satisfy the above noted logical or functional requirements.

It is thus seen that if clock cycle code letter "A" has been read from tape 20 by tape reader 21 and transferred into final storage 42, the decoder 108 will have sensed the letter "A" in final storage and the clock cycle "A" gate will be open while all other clock cycle gates are closed.

As soon as the start pulse is applied over line 60, to flip-flop 91 thereby opening gate 93 and applying the 20 kilocycle input from master oscillator 66 to the chain of flip-flop dividers in the clock cycle 46, the 20 kilocycle input will be applied over line 101 through the open "A" gate and thence over line 80a to the trigger input terminal of the tens decade of the pulse distributor counter. The counter will then count ten thousand of these twenty thousand per second pulses and will thus emit the output carry pulse over line 49 exactly at the end of one-half second. This same pulse, of course, also resets flip-flop 91 thus shutting off the 20 kilocycle input to the clock cycle control. As explained above, the final end-carry output pulse on line 49 resets final storage, transfers the next command from intermediate storage, starts tape reader 21, and, having gone through delay elements 50, 52 and 54, again returns to pulse distributor 48, over line 60 to set flip-flop 91 and reopen gate 93. Let us assume that the next command which, by this between cycle timing, was transferred to final storage, contained the clock cycle code letter "B." Decoder 108 now puts out a signal which opens the clock cycle "B" gate and closes all other clock cycle gates. Hence, the 20 kilocycle output from gate 93 is now passed through flip-flop 95 and the 10 kilocycle output of this flip-flop is applied over line 102 and through the "B" gate to line 80a and thence to the trigger input of the tens decade. The counter will now take exactly one second to count ten thousand of the 10 kilocycle pulses before emitting its end carry pulse which starts the process over again. Similarly, it will be seen that if the "C" gate of the clock cycle control is open, a 5 kilocycle input is applied to line 80a and the pulse distributor counter will complete its count of 10,000 and emit its end carry pulse at the end of exactly two seconds.

It will be noted, however, that each of the remaining gates D through J of the clock cycle control are connected over line 80b to the trigger input terminal of the units decade of the pulse distributor. Thus, if the "D" gate is open, the 20 kilocycle output from gate 93 is directly applied to line 80b. The counter now, however, makes a count of 100,000 before emitting its end carry pulse. Since the input pulses from gate D occur at 20,000 per second, the count will be completed at the end of 5 seconds. Similarly, a 100,000 count of ten kilocycle pulses from gate "E" is completed at the end of 10 seconds, the 100,000 count of five kilocycles pulses from gate "F" is completed at the end of 20 seconds, a 100,000 count of 2.5 kilocycles pulses from gate "G" is completed at the end of 40 seconds, a 100,000 count of 1.25 kilocycles pulses from gate "H" is completed at the end of 80 seconds, a 100,000 count of 625 cycle pulses from gate "I" is completed at the end of 160 seconds, and a 100,000 count of 312.5 cycle pulses from gate "J" is completed at the end of 320 seconds.

It is thus seen that the binary-decimal code for each of the letters "A" through "J" defined in FIG. 4 and stored for each command in final storage unit 43 as shown in FIG. 5 can, by means of the apparatus shown in FIGURES 6, 7 and 8, control the exact length of time during which a separate train of output pulses is emitted from pulse distributor 48 over line 65 for each of the four axes of motion channels x, y, z, and b. As suggested above, the exact number of pulses in each of these four pulse trains emitted over line 65 is controlled by the value of the associated number in final storage by virtue of the correspondence between the coding of the value of the coded numbers, x, y, z, and b, stored in final storage and the pattern of non-carry output pulses available from the various flip-flop stages of each of the decades of the pulse distributor counter as illustrated graphically in FIG. 6.

Thus, turning to FIG. 8 it will be seen as noted above that the non-carry output terminals 81, 83, 85 and 87 of the flip-flops of the units decade are each, respectively, connected to the inputs of four gates, one for each of the motion axes channels, x, y, z, and b. Similar connections are made for each of the other decades in the pulse distributor. The output of each of the x axis gates in the output gating matrix 64 is, in turn, connected over line 110 to the input of a divide-by-two flip-flop 111. Similarly, each of the outputs of the y axis gates are connected by a line 112 to the input of a divide-by-two flip-flop 113 and each of the outputs of the z axes gates are connected by a line 114 to the input of a divide-by-two flip-flop 115. The output of each of the gates in the b axis, however, is connected by a line 116 directly to the inputs of sign gates 117 and 118 controlling the b axes in the sign gate unit 62. The output of flip-flop 115 in the z channel is similarly connected to the z channel sign gates 119 and 120; the output of flip-flop 113 in the y channel is similarly connected to the inputs of sign gates 121 and 122 in the y channel, and the output of flip-flop 111 is similarly connected to the inputs of sign gates 123 and 124 in x channel. The reason for the interposition of divide-by-two flip-flops 111, 113 and 115 in the x, y, and z channels involves merely a matter of convenience in scale factor units which is not essential to the invention but which will be discussed below, after returning to a consideration of the overall operation of the output gating matrix 64.

It will be noted that output gating matrix 64 contains eighty gates and that the number of numeric bits contained in any command stored in final storage is also eighty. That is to say, there is a one to one correspondence between the gates of matrix 64 and the storage registers of final storage unit 43. Each of the gates in matrix 64 is controlled by an input signal applied over an input line each of which is labeled "C" in FIG. 8. Of course, all of the gates connected to the x axes output channel are controlled by the numeric bits of the x number in final storage and similarly for each of the other channels. It should be recalled, however, that within a given channel there is an inverse relationship between the arrangement of the digits in the storage registers of final storage and the controlled output gates in the gating matrix. That is to say, for example, the four registers containing the four bits of the units digit of the x number are connected to control the four output gates from the 10,000 decade of the pulse distributor counter, whereas the four storage registers containing the binary representation of the 10,000's digit of the x number are connected to control the four output gates receiving non-carry pulse output from the units decade of the pulse distributor counter. The reason for this will be apparent from a consideration of FIGURES 6, 7 and 8. If, for example, the x number read into final storage in any given command calls for a motion of only 0.0008 inch, then only the gates associated with FF1, FF2 and FF4 of the 10,000's decade of the pulse distributor counter will be opened by the control signals applied over line "C" from final storage. No matter what clock cycle time has been specified, there will be only ten input pulses applied to the 10,000 decade, during one complete cycle. These input pulses will produce five non-carry output carry pulses from FF1, two non-carry output pulses from FF2, and one non-carry output pulse from FF4. These eight pulses are applied over line 110 to the input of flip-flop 111. The ninth non-carry output pulse produced by FF3 is, of course, blocked by the associated closed output gate. Of course, if the x number in final storage is simply 0.0008, all gates of all other decades in the $x$ channel will be closed by virtue of signals from the zero containing registers coming to these gates over the control lines from final storage.

To take another example, let us assume that the $x$ number in final storage is 7.0000 rather than 0.0008, thus calling for a motion of seven inches. The 10,000 digit registers of final storage are connected to the output gates controlling output from the units decade of the pulse distributor by control lines C. Hence, the output gates associated with FF1 and FF2 of the units decade of the pulse distributor counter will be open and all other $x$ gates will be closed. No matter what clock cycle time is specified from 5 to 320 seconds, corresponding to tape code letters D through J, 100,000 pulses will be applied over line 80$b$ to the input of the unit's decade counter at a rate and over a time period determined by the specified clock cycle tape code letter. FF1 of the unit's decade will thus produce 50,000 non-carry output pulses and FF2 will similarly produce 20,000 non-carry output pulses. All other non-carry output pulses produced by other flip-flops or other decades of the counter are, of course, blocked by the fact that the associated gates are closed by signals from final storage. The 70,000 non-carry output pulses from flip-flops 1 and 2 are applied over line 110 to the input of flip-flop 111.

It is thus apparent that if a clock cycle time of less than 5 seconds is called for, via clock cycle gates A, B or C, only a four digit rather than a 5 digit magnitude of motion can be specified since the outputs from the A, B, and C gates of the clock cycle control are applied directly to the binary input of the tens decade of the pulse distributor counter to measure these particular clock cycle time intervals. It will, of course be understood, however, that this limitation is not inherently necessary to the invention but is simply one which is conveniently suited to the particular type of machine being controlled and is hence embodied in the particular illustrative circuitry shown. That is, in controlling this milling machine it would not be realistic to call for a motion of one inch or more (that is, a five digit number) in less than five seconds.

It will further be understood that the same type of logic illustrated in the above examples dealing with the connection of the gates in the $x$ channel is also used in connecting the control lines to the gates of the other channels, i.e., to the $y$ axes channel, the $z$ axes channel and the $b$ axes channel in order to produce a predetermined number of pulses on these channels in accordance with the number in final storage.

The divide-by-two flip-flops 111, 113 and 115, are interposed in the $x$, $y$, and $z$ output channel, respectively, since although the numerical unit of tape coding for the particular illustrative embodiment of the invention is in 10,000ths of an inch, the servo-mechanism driving the hydraulic rams of the controlled machine is actually calibrated so that 0.0002 inch is the basic unit of measure for the motion caused by one input pulse from the $x$, $y$ or $z$ channels. The rotary motion of the work holder controlled by output signals from the $b$ channel however, is actually calibrated in hundredths of degrees which corresponds to the coding initially used on tape. The manner in which the basic unit, or measure of distance, equal 0.0002 inch is determined by the servo-mechanism will be explained in detail below. It is here sufficient to note that the divide-by-two flip-flop 111, 113 and 115 serve to provide one output pulse for every two output pulses called for by the information as encoded on the tape so that the servo-mechanism, which moves 0.0002 of an inch for each pulse applied to it will, in fact, produce the motion actually called for by the tape. It should be further noted that the conversion of units provided for in this manner is purely a matter of convenience and that if the servo-mechanism were so designed as to have a basic unit of motion equal to the same basic measure or unit of information encoded on the tape, the flip-flops 111, 113 and 115 could be omitted.

It will be noted from FIG. 5 that the $x$, $y$, $z$ and $b$ outputs from the output gating matrix 64, are each applied to two of a set of eight sign gates 62 which are controlled by the sign bits in final storage by signals applied over line 61. These sign gates are shown in greater detail in FIG. 8. It will be noted that the output from flip-flop 111 is applied to the signal input terminals of both the plus and minus $x$ gates, the output of flip-flop 113 is applied to the signal input terminal of both the plus and minus $y$ gates, the output of flip-flop 115 is applied to the signal input terminals of both the plus and minus $z$ gates and the output from line 116 is applied to the signal input terminals of both the plus and minus $b$ gates. Each of these sign gates has a control line $c$ associated therewith, each control line being one channel of cable 61. It will, of course, be understood that, as is well known, two output signals can be derived from any one flip-flop such as is used in the final storage element to represent each single sign bit. Thus if a particular flip-flop is in the one representing state (indicating a plus sign) one of its output terminals will have a relatively high voltage whereas the other of its output terminals will have a relatively low, or zero, voltage. On the other hand, if the flip-flop is in its zero representing state (indicating a minus sign) these conditions will be reversed and the first output terminal will have a relatively low voltage whereas the other output terminal will have a relative high output voltage. Hence, by connecting each of the central lines $c$ of the $x$ sign gates to the appropriate output terminal of the flip-flop in final storage which stores the $x$ sign indicating bit, one of the sign gates may be held open and the other sign gate held closed in accordance with whether the stored bit is a one or a zero indicating a plus or a minus sign. Similar considerations, of course, apply to each of the other sign gates.

Each of the sign gates, 117 through 124, respectively, has its signal output terminal connected to one of four phase modulators in a phase modulator unit 125. As noted above, of course, only four of the eight sign gates are open during any one command. As further seen above, the output gating matrix 64 provides for each command a train of pulses for each of the four channels $x$, $y$, $z$, and $b$ which is substantially uniformly distributed over a time interval determined by the tape clock cycle code letter and which consists of a number of pulses equal in magnitude to the corresponding number $x$, $y$, $z$, or $b$, respectively, placed in final storage for that command. The pulse train for each number is, in turn, routed through either the plus or minus sign gate for that particular channel in accordance with the value of the sign bit in final storage during a given command. These four trains of output pulses are applied to the respectively associated modulator of phase modulator unit 125 in a manner and for a purpose which may be seen from the more detailed block diagram of one phase modulator in unit 125 shown in FIG. 9. It will also be noted that both the "A" pulse and the "B" pulse outputs from master oscillator 66 and pulse forming circuit 69, are also applied to phase modulator unit 125 over lines 126 and 127 respectively.

Figure 9:
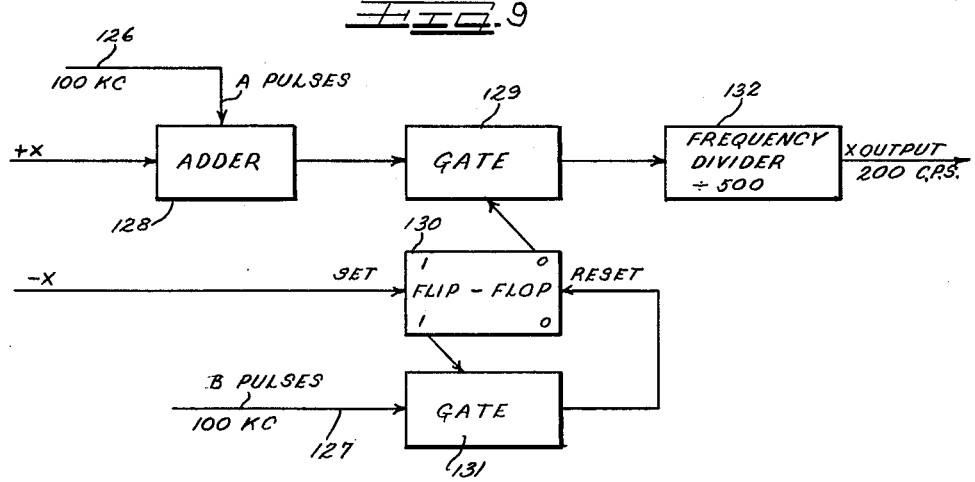
FIGURE 9 is a detailed block diagram of the phase modulator of the system of FIG. 5.

The detailed nature of the structure and operation of phase modulator unit 125 may be seen from the more detailed block diagram of one phase modulator thereof shown in FIG. 9. In FIG. 9 it will be noted that the A pulses from the master oscillator are applied over line 126 to one input of an adder 128. The output of the pulse $x$ gate 124 is applied to another input of adder 128. The output of adder 128 is applied to the input of a gate 129 which is controlled by a signal from the zero indicating output terminal of a flip-flop 130 in a manner similar to that discussed in detail above in connection with the control of the sign gates by final storage flip-flops. The one indicating terminal of flip-flop 130 controls a second gate 131 to the input of which the B pulses on line 127 are applied. The output of gate 131 is connected to the reset input terminal of flip-flop 130, whereas the output of the minus x sign gate 123 is connected to the set input terminal of flip-flop 130.

The output of gate 129 is applied to a frequency divider 132. The frequency divider 132 is preferably a cascaded chain of flip-flops plus necessary conventional feed back networks, the circuit being so arranged that the chain will count down in a ratio, for example, of 500, that is to say, so that the frequency divider will provide a squarewave output having a frequency $1/500$ of the frequency of the input trigger pulses. More generally the output frequency is $1/N$ times the input frequency where N is the count down ratio.

The operation of the phase modulator shown in FIG. 9 may be seen as follows. Let us assume that the minus $x$ gate 123 is closed and that the plus $x$ gate 124 is open. There will then be no input signals to the set input terminal of the gate control flip-flop 130. If flip-flop 130 is already in the set condition, gate 131 is enabled or open, and gate 129 is disabled or closed. The first of the B pulses occurring on line 127, however, will be applied to the reset input terminal of flip-flop 130 thereby resetting the flip-flop and opening gate 129 while simultaneously closing gate 131. The flip-flop will, of course, remain in a reset condition until at some future command a set pulse is applied to it over the minus $x$ channel.

With gate 129 open, the A pulses at the 100 kilocycle frequency which are applied to the adder 128 over line 126 are passed through gate 129 to the input of frequency divider 132. In the absence of any input pulses $x$ gate, the output of frequency divider 132 will be an unmodulated 200 cycle per second squarewave. The same A pulses which are applied over line 126 are also applied, as shown in FIG. 5, over line 133 to another divide-by-five hundred frequency divider 134 which is identical with the frequency divider 132. The output of frequency divider 134 will, of course, always be an unmodulated 200 cycle per second squarewave and is used in the phase detector of the servo-system as a reference signal. This reference output from frequency divider 134 is indicated in the volt-time wave form diagram of FIG. 10 as the wave-form 135.

As noted above in connection with FIG. 9, for a command in which the "plus $x$" gate is open but no pulses have as yet passed through it, the gate 129 will be open and the output of frequency divider 132 will be identical with the output of frequency divider 134. That is to say, there will be no phase difference between them until a pulse arrives from the "plus $x$" gate 124. It will be recalled, however, that any information pulse derived from any of the gates of the output gating matrix 64 must occur at some B pulse time. That is, they must coincide with some B pulse rather than with any A pulse since it is the B pulses from pulse forming circuit 69 which are applied over line 74 through frequency divider 77 and line 78 to gate 93 and line 94 and thence to the clock cycle control 46, to ultimately supply the output from pulse distributor 48 which is applied through the output gating matrix 61 and sign gate 62 to the phase modulator. Each B pulse must further occur half way between two A pulses as explained in detail above. That is to say, the 100 kilocycle A pulses are, of course, separated by a ten microsecond time interval and any B pulse must occur exactly five microseconds after the previous A pulse. Thus the $x$ pulse train put out by the pulse distributor through the output gating matrix consists of a train of pulses equal in number to the number $x$ contained in final storage and each pulse occurring at some B pulse time interval with respect to the A pulses.

When the first of this train of "plus $x$" pulses occurs, it is passed through adder 128 and gate 129 to the frequency divider 132, thus supplying an additional trigger input pulse to the counters of the frequency divider 132.

Referring again to FIG. 10 and considering the wave-form 135, it will be noted that in the absence of any B pulses, the last stage of the cascaded counter will have gone through one complete cycle after counting 500 ten microsecond pulses over a total time period of 5,000 microseconds. Initially, the output voltage of the counter is zero. Half way through the count (at 2,500 microseconds) it rises to some positive value, and at the end of the count, that is at the end of 5,000 microseconds, it returns to its initial zero value. The same considerations, of course, apply to the frequency divider 132 in the absence of $x$ input pulses.

Let us suppose now, however, that the first "plus $x$" pulse arrives from the "plus $x$" gate 124 at some time between 2,500 and 5,000 microseconds. Each such pulse will effectively shorten the time required for the counters of the frequency divider to reach a count of 500 by ten microseconds, since each B synchronized pulse arriving over the "plus $x$" line performs the same function in the counters of the frequency divider as would another A pulse which could only occur at ten microsecond interval. Therefore, for each B synchronized pulse applied over the "plus $x$" line, the counting time for a given 500 count cycle will be reduced by ten microseconds. Since the total counting time for one complete cycle of the frequency divider is 5000 microseconds, each $x$ or each B synchronized pulse will reduce this counting time by $$\frac{10}{5000}$$

or by $1/500$ of a cycle. Since $1/500$ of 360° is equal to 0.72°, however, this is fully equivalent to saying that each B synchronized pulse will cause a phase shift of exactly 0.72°. Furthermore, these synchronized pulses applied over the "plus $x$" line will decrease the counting time and thereby produce a phase lead in the output from frequency divider 132. Assuming, for example, that 125 such x pulses are added to the A pulses applied over line 126 during the first cycle, the counting time will be reduced by 1250 microseconds and the $x$ output from counter 132 will be of the form shown as waveform 136 in FIG. 10. It is thus seen that a 90° phase lead has been produced in wave form 136 with respect to wave-form 135.

Figure 10:
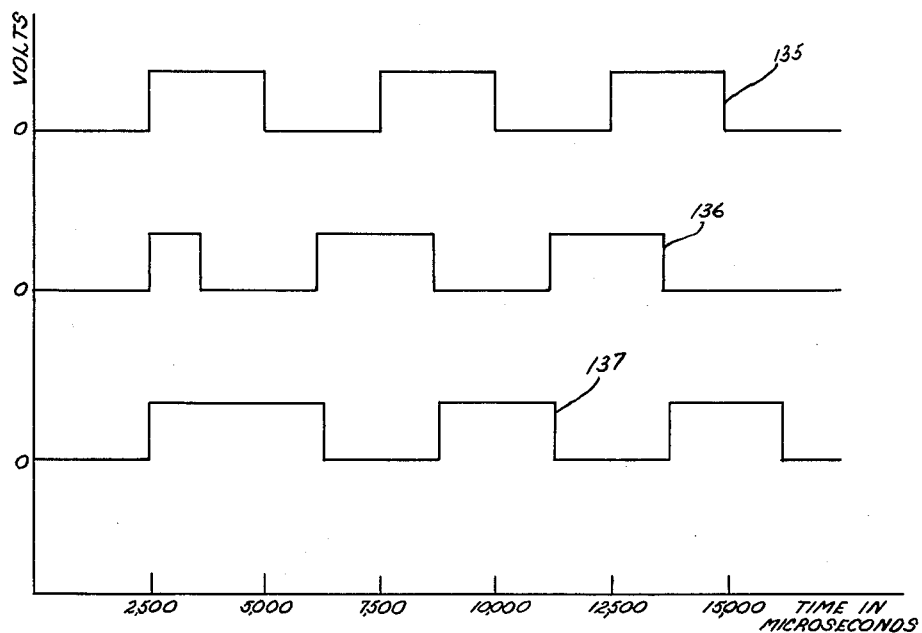
FIGURE 10 is a volt-time waveform diagram illustrating the operation of the phase modulator of FIG. 9.

Of course, the wave forms of FIG. 10 assume that all 125 of the "$x$" pulses occurred during the last half of the first cycle of the count. In practice, the situation illustrated would be most likely to occur if the tape reader 21 were stopped either by program command or by manual means after the first cycle shown. In this event, it should be noted that when the tape is stopped, so long as the master oscillator continues to operate as it normally would, the last instruction or value for each channel read from final storage and converted into a phase modulated output, is maintained in the phase modulated output even though final and intermediate storage are completley reset and even though the tape reader is stopped. That is to say, once the operation of the two frequency dividing counters, 134 and 132, has been displaced in time, the same phase displacement will inherently continue until they are brought back into phase by some positive action. For this reason, it is possible to completely stop the automatic program of the director of the present invention and yet maintain the last output signal so as to hold the machine being controlled in the position it occupied when the program was stopped.

Returning to FIG. 9, let us assume that the command being executed has closed the "plus $x$" gate 124 and opened the "minus $x$" gate 125. Since each "minus $x$" command pulse, occurring at a B synchronized time, sets the gate control flip-flop 130, thus turning off gate 129 and turning on gate 131, the next or following A synchronized pulse coming over line 126 five microseconds later is prevented by closed gate 129 from reaching the frequency divider 132. Since gate 131 is thus left open, however, the following B pulse occurring on line 127, will pass through gate 131 and reset the gate control flip-flop 130 to its original reset position in which the output from its zero terminal is used to hold gate 129 open and the output from its one terminal is used to hold gate 131 closed. It results from this sequence of events, that a single pulse occurring along the "minus $x$" line at a B synchronized time will prevent the next following A synchronized pulse on the line 126 from reaching the frequency divider 132. Thus, for each "minus $x$" or B synchronized information pulse in the output of the pulse distributor, one and only one A synchronized pulse will be prevented from reaching the frequency divider 132. It follows that for each "minus $x$" pulse, the frequency divider 132 will require exactly ten microseconds longer to reach its count of 500. By reasoning similar to that used in discussing the waveform 136, it also follows that each "minus $x$" pulse will produce a phase lag in the output from the divider 132 of exactly 0.72° with respect to the reference output waveworm 135. If, for example, one hundred and twenty-five B synchronized pulses occur on the "minus $x$" input line to flip-flop 130 during the last half of the first cycle of the reference wave 135, the output of the frequency divider 132 will be as illustrated in the wave form 137, in FIG. 10. That is to say, the output from divider 132 will lag the output from divider 135 by exactly 90°, or by 0.72 degree per "minus $x$" input pulse. Again it is assumed for convenience that all 125 of these pulses occur during the last half of the first cycle. It will, of course, be understood, however, that in practice these pulses will be relatively uniformly distributed by the pulse distributor over the complete interval called for by the clock cycle code associated with a particular command as may be seen from the waveform diagram of FIG. 6. The effects of each such pulse, however, are incrementally added wherever the pulse may occur so as to produce a cumulative phase modulation effect the same as that illustrated in exaggerated form in FIG. 10.

It is thus seen that the phase modulation in effect performs a digital to analogue conversion in order to provide an output signal suitable for application to the analogue servo-systems 23. Of course, it will be understood that the modultaor unit 125 of FIG. 5 consists of four complete modulators each identical to the circuits shown in FIG. 9. That is to say, one phase modulator of the type shown in FIG. 9 is provided for each of the four channels $x$, $y$, $z$, and $b$. Each of these phase modulators will produce an output from its frequency divider which is phase modulated with respect to the output from reference frequency divider 134 by an amount determined by the sign and magnitude of the command in final storage which is controlling that particular channel. These five outputs constitute the output signal of the director 22 shown in FIGS. 1 and 11, as being applied to the servo-systems 23, there being one servo-system for each axis of motion.

In FIGURE 11, only one of the servo-systems is shown for clarity of illustration. The input stage of each servo-system 23 is a phase demodulator 138 which functions to produce a unidirectional voltage having a polarity which is positive for a phase lead and negative for a phase lag and having an amplitude which is proportional to the degree or amount of phase modulation. This phase demodulator will be described in detail below.

The reference signal, such as waveform 135, is applied to phase synchronize a sine wave generator 145a (which may conveniently be a phase synchronized oscillator) to convert square wave 135 to a sine wave of equivalent phase. Alternatively, a filter tuned to 200 c.p.s. fundamental frequency of the director output could be used in place of the oscillator to produce this sine wave. This sine wave is then applied to a manual phase shift network, which in practice is conveniently made a resolver of the conventional rotor-stator type as indicated by block 145, and through a similar feedback control resolver 146 to one input of phase demodulator 138. The square wave command signal from the director is applied to the other input of the phase demodulator as may be seen in FIGURES 11 and 14. The function of resolvers 145 and 146 will be described in detail below, but for the moment let us assume that they are set to produce zero phase shift.

The phase demodulator 138 then has its output amplified by a D.C. amplifier 139, the output of which is in turn used to drive a torque motor 140 which in turn controls hydraulic control valve 141 so as to operate a hydraulic ram 142 or any other convenient mechanism for producing motion along one of the $x$, $y$, $z$, or $b$ axes as indicated in FIGURE 2.

Any convenient means for sensing the motion actually produced as a result of the input signal is used to provide feedback signals for the servo-system. Thus, for example, a rack and pinion arrangement of a type well-known in the art may be used to sense the relative motion between frame 27 and table 26 along the $x$ axis. Conveniently, the geared rack may be affixed to the moving table and the pinion gear driven by it may be affixed to the frame. The pinion gear in turn drives the rotor of feedback resolver 146. This rack and pinion may also be geared to drive a rate feedback tachometer generator 143 the output from which is applied through an adjustable lead-lag phase adjusting network 144 and thence to the input of amplifier 139 as rate feedback to the D.C. amplifier for stabilization purposes in accordance with well-known principles of servomechanism operation.

Figure 19:
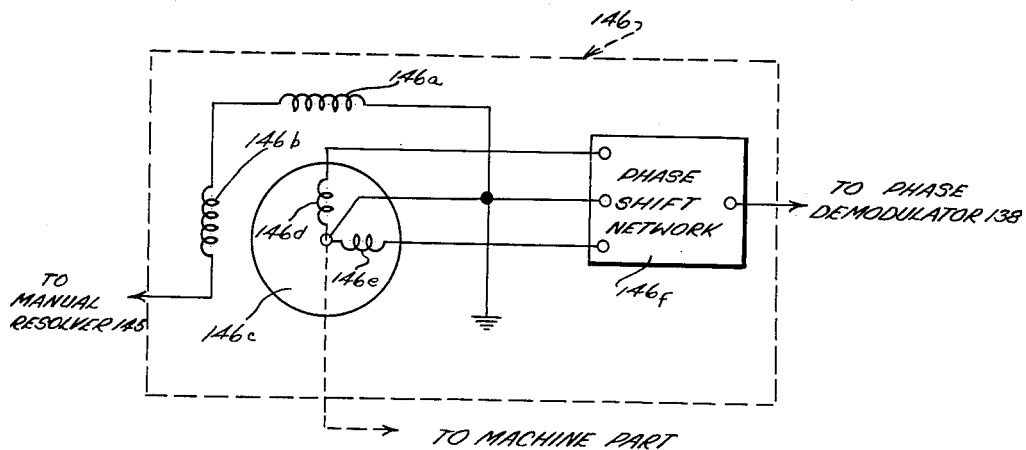
FIGURE 19 is a schematic diagram of a feedback resolver used in the system.

FIGURE 19 is a schematic illustration of the feedback resolver 146 which in itself is old and well known. The resolver 146 comprises a pair of stator coils 146a and 146b having axes at right angles to each other and a rotor 146c including a pair of rotor coils 146d and 146e, also at right angles to each other. The rotor 146c is mechanically coupled to a machine part which is controlled. The stator coils 146a and 146b are connected to the manual phase shift resolver 145, while the rotor coils 146d and 146e are connected through a phase shift network 146f to the phase demodulator 138. The network 146f functions to effect a 90° phase shift in the signal from one rotor coil relative to the signal from the other rotor coil, before such signals are combined. As a result, the signal applied to the phase demodulator is shifted in phase relative to the phase of the input signal, by an amount determined by the angular position of the rotor 146c. In the alternative, the phase shift network may be used in the stator coil circuit, to shift the phase of the signal applied to one stator coil 90° relative to the phase of the signal applied to the other.

In FIGURE 14, there is shown a more detailed block diagram of the circuit of the phase demodulator 138, the operation of which is illustrated by the wave-form diagrams of FIGURES 15, 16 and 17. The inputs to the phase demodulator 138 are first a 200-cycle per second sine wave which is applied from the feedback resolver 146 over line 180 to a sine wave amplifier 181 and secondly, a 200-cycle per second square wave which is the command signal applied from director 22 over line 182 to a square wave amplifier 183. It is the function of the phase demodulator to compare the phase of these two inputs and produce a D.-C. or unidirectional output voltage whose magnitude and polarity is in direct proportion to this phase difference.

In order to perform this function, the sine wave output of amplifier 181 is converted to a square wave by squaring circuit 182. Many such squaring circuits are known in the art and circuit 182 may, for example, comprise a high gain amplifier followed by a clipper stage. It will be noted from FIGURE 14 that the output of both the squaring circuit 182 and the square wave amplifier 183 are each applied in two directions, first to a pulse amplifier and also to a flip-flop. Thus, the output of squaring circuit 182 is applied both to pulse amplifier 184 and to the reset input terminal of flip-flop 185. Similarly, the output of square wave amplifier 183 is applied to pulse amplifier 186 and is also applied to the reset input terminal of flip-flop 187. Each of the pulse amplifiers 184 and 186 are connected to provide as an output a negative pulse each time the square wave input to the pulse amplifier goes positive. It will be noted that the negative pulse output from pulse amplifier 184 is applied to the set input terminal of flip-flop 187 and that the negative pulse output from pulse amplifier 186 is applied to the set input terminal of flip-flop 185. It will also be noted that voltage outputs are derived from the reset output terminal of flip-flop 185 and from the set output terminal of flip-flop 187. These two outputs from flip-flops 185 and 187 respectively are applied to a summing amplifier 188, the output of which is in turn applied to an averaging circuit 189. The output of the averaging circuit 189 is in turn the D.-C. signal which is applied over line 190 to the D.-C. amplifier 139.

The operation of the circuit of FIGURE 14 is illustrated in the wave-form diagrams of FIGURES 15, 16 and 17, in all of which voltage is plotted as ordinate against time as abscissa. Returning for the moment to FIGURE 14, however, it will be recalled that each of the flip-flops 185 and 187 have two input terminals, set and reset, and two output terminals, set and reset. Definitions of these terms have been given in the earlier discussion. Furthermore, the circuitry of each of the flip-flops 185 and 187 is such that neither input terminal of either flip-flop will respond to positive-going input signals, but only to negative-going input signals. If a negative pulse or negative-going signal is put into the reset input terminal of one of the flip-flops, the circuit will assume its reset state in which the voltage on its set output terminal is at some relatively low value and the voltage on its reset output terminal is at a relatively high value. Of course, if the flip-flop has previously been in the set state, the voltage on its set output terminal will drop to this relatively low value when the negative-going signal is applied to the reset input terminal and will remain at this value until a negative-going input signal is sent to the set input terminal of the flip-flop. When the flip-flop is already in its reset state, the application of more negative pulses to the reset input terminal will have no effect. The voltage at the reset output terminal is already at some relatively high voltage level and will remain there as noted above until a negative-going signal is applied to the set input terminal. Thus, whenever the set output is low, the reset output is high and vice-versa. Now, if a negative pulse or negative-going signal is applied to the set input terminal of a flip-flop which is in the reset state, the voltage levels of the set and reset output terminals will reverse. That is to say, the set output will rise to some relatively high voltage and will remain there whereas the reset output will drop to some relatively low voltage. As noted above, the circuits of flip-flops 185 and 187 are such that positive pulses or positive-going signals will not affect them.

Turning now to FIGURE 15, there is shown in graph a thereof a volt-time wave-form diagram of the resolver feedback signal which is applied from squaring circuit 182 to flip-flop 185 and to pulse amplifier 184. In graph b of FIGURE 15, there is shown in a similar volt-time wave-form diagram of the command signal from the director which is the signal applied from squaring circuit 183 to flip-flop 187 and to pulse amplifier 186. In graph c and d of FIGURE 15 there are respectively shown volt-time wave-form diagrams of the reset output voltage of flip-flop 185 and of the set output voltage of flip-flop 187.

It will be noted that the graphs of FIGURE 15 assume that both of the flip-flops 185 and 187 are initially in the reset state. Thus, the reset output of flip-flop 185 will be at a value which is relatively high by comparison to the set output of flip-flop 187. The first change occurs at time t1 when the resolver signal goes positive as shown in graph a of FIGURE 15. This positive-going signal does not affect flip-flop 185, but the inverted pulse it produces from pulse amplifier 184 goes to the set input terminal of flip-flop 187 causing its set output to rise as shown in graph b of FIGURE 15. The next change occurs at time t2 when the director signal rises in the positive-going direction as shown in graph b of FIGURE 15. This does not affect flip-flop 187, but again the inverted pulse produced by pulse amplifier 186 is applied to the set input terminal of flip-flop 185 causing the reset output of this flip-flop 185 to drop in the negative-going direction as shown in graph c of FIGURE 15. At time t3, the resolver signal goes negative as shown in graph a of FIGURE 15. This negative-going signal, which is applied to flip-flop 185 directly, resets this flip-flop causing its reset output to rise as shown in graph c of FIGURE 15. Of course, the resulting positive pulse from pulse amplifier 184 has no effect upon flip-flop 187. Finally, the director signal goes negative at time t4 as shown in graph d of FIGURE 15. This negative signal applied from amplifier 183 to flip-flop 187 resets the flip-flop 187 causing its set output voltage to drop as shown in graph d of FIGURE 15. Again, the resulting positive pulse applied from pulse amplifier 186 to the set input terminal of flip-flop 185 has no effect thereon. The cycle of operation then continues in the same manner producing the remainder of the wave-forms shown in FIGURE 15.

It will be recalled that the reset output from flip-flop 185 which is plotted in graph c of FIGURE 15 and the set output of flip-flop 187 which is plotted in graph d of FIGURE 15 are both applied to summing amplifier 188. The output circuit of summing amplifier 188 contains a circuit to balance out the D.-C. level present in its output signal. Here the term "D.C. level" is used to mean the value of the sum of the wave-forms from the outputs of flip-flop 185 and 187 respectively when the input signals to these flip-flops are exactly in phase. In FIGURE 16, there are shown volt-time wave-form diagrams of the outputs of flip-flops 185 and 187 and of the sum of these outputs for three cases in which the resolver signal is respectively leading, lagging or exactly in phase with the command signal from the director. It will be noted from graphs c, f and i, respectively, in FIGURE 16 that the D.-C. level in each of the three cases for a leading, a lagging or an in-phase signal relationship is the same. In each of these above-named graphs, the D.-C. level is indicated by the appropriately labeled dotted line. This D.-C. component-level of the output voltage of the summing amplifier 188 is balanced out as noted above in order to produce from the summing amplifier output signals having the wave-forms shown in graphs a, c and b of FIGURE 17 corresponding respectively to graphs c, f and i of FIGURE 16. This D.-C. component may be balanced out by the simple expedient of adjusting a D.-C. bucking voltage so as to produce a zero D.-C. output when oscilloscope monitored input voltages are shown to be in phase. This D.-C. component is balanced out in order to provide a zero volt output D.-C. when the input signals are in phase so that this output can be applied through averaging circuit 189 to a single ended input of the D.-C. amplifier 139.

Returning to FIGURES 16 and 17, it will, of course, be realized that in the first case where, for example, the resolver signal is leading the command signal, the output wave-forms shown in graphs a and b of FIGURE 16 will be produced from flip-flops 185 and 187 respectively. The sum of these wave forms is shown in graph c of FIGURE 16. Similarly, for the case where the resolver is lagging, the flip-flop outputs are shown in graphs d and e and their sum is shown in graph f of FIGURE 16. Finally, for the case where the resolver is in phase with the command signal from the director, the flip-flop outputs are shown in graphs g and h and their sum is shown in graph i of FIGURE 16. When the D.-C. component of these signals has been balanced out, as discussed above, the signal of graph c of FIGURE 16 will appear as shown in graph a of FIGURE 17, the signal of graph f of FIGURE 16 will appear as shown in graph c of FIGURE 17 and the signal of graph i of FIGURE 16 will appear as shown in graph b of FIGURE 17.

The averaging circuit 189 derives the average D.-C. value of the signals shown in FIGURE 17 and it is this average value which is applied over line 190 to the D.-C. amplifier 139. Of course, this average value is determined by the widths of the pulses shown in FIGURE 17 insofar as its magnitude is concerned and is determined in polarity by the polarity of the pulses shown in FIGURE 17. It will be obvious from a reconsideration of FIGURES 15 and 16 that the widths of these pulses are in turn determined by the phase relationship between the feedback resolver signal and the command signal. The averaging circuit 189 may, for example, be a capacitor connected across the output of the summing amplifier, or it may be any well-known circuit for deriving the first or D.-C. term in the commonly known Fourier expansion for the pulse wave-forms. As shown in FIGURE 17, this average or D.-C. value will be zero for the case illustrated in graph b where the two input signals are in phase and will have a positive value the magnitude of which is determined by the widths of the pulses in graph a for the case in which the resolver is leading. Similarly, this average value will have a negative polarity and a magnitude determined by the widths of the pulses shown in graph c of FIGURE 17 for the case in which the resolver is lagging. Furthermore, the magnitude of the average or D.-C. value will be determined by the degree of phase difference between the signals from squaring amplifier 183 and squaring circuit 182.

As noted above, it is this average signal shown in the graphs of FIGURE 17 by dash and dot lines which is applied to D.-C. amplifier 139 which in turn drives torque motor 140, hydraulic control valve 141 and hydraulic ram 142 in order to produce the motion of the machine part. As noted above, this motion is in turn sensed by the rack and pinion driven feedback resolver 146 which acts as a mechanical to electrical transducer to express the amount or degree of motion produced as a phase change in the reference signal applied to the feedback resolver 146 from the sine wave generator 145 and director 22.

In the particular exemplary system being described, the gear ration of the rack and pinion arrangement which drives the feedback resolver is such that each 0.0002 inch of linear motion of table 26 will rotate the rotor of feedback resolver 146 so as to produce a phase shift of exactly 0.72 degree in its output signal as compared to its input signal.

As noted above, the divide by two flip-flops 111, 113 and 115 are placed in the output channels of the output gating matrix to allow for the fact that the input program tape is coded in units of one pulse for each one tenthousandths of an inch without flip-flops 111, 113 and 115 each such pulse would produce a phase shift of 0.72° in the input signal to the servo. The gear ratio of the rack and pinion driving the feedback resolver, however, is such as to produce a phase shift of 0.72 degree, the same phase shift produced by each individual output pulse from the pulse distributor, for a lineal motion of 0.0002 inch rather than 0.0001 inch in the use of flip-flops 111, 113, and 115 compensates for this difference in calibration. It will thus be seen that if the gear ratio of the rack and pinion sensor were made such as to produce 0.72 degree phase shift for each 0.0001 inch of lineal motion, the flip-flops 111, 113 and 115 would not be required.

In operation, a steady state is achieved, and the controlled machine element will remain stationary, when there is no phase difference between the command signal and the reference signal applied to phase demodulator 138. In this instance the output of the phase demodulator is zero and no actuating force is applied to the torque motor. When a command is read from the tape which produces a phase shift in the command signal in the manner described in detail above, the phase demodulator senses this phase difference and provides a D.-C. output voltage proportional in magnitude and sign to the phase difference.

This output drives the torque motor 141 through the amplifier 140 thus producing the motion of the machine part such as that of table 26 along the x axis. This motion in turn causes rotation of the rotor of the feedback resolver 146. As soon as the total motion has the magnitude called for by the original command signal, the feedback resolver 146 will have been rotated sufficiently to produce a phase shift in the reference signal passing through it equal to the phase shift produced in the command signal by the phase modulation 125 controlled by the command read from the tape and converted through the pulse distributor. Hence, as soon as the controlled machine element moves the distance called for in the take command, the feedback resolver will again reduce the phase difference between the command signal and the reference signal to zero and the machine element will stop to await the next command. Of course, in practice, the program information is so timed as to produce substantially continuous motion. As noted above, actual between cycle or between command timing is determined by delay units 50, 52, and 54.

The manual phase shift resolver 145 is included in the circuit so that the controlled machine element can be moved manually or independently of the director command by a human operator if desired without disconnecting the director from the servo-system. At any time when tape reader 21 has been stopped and the last command executed, manual phase shift resolver 145 may be used to control the machine. A manual control to turn the rotor of resolver 145 may conveniently be positioned either on the controlled machine or on control console 25. It will be apparent that if the program of the director has been stopped, either by an automatic program stop code or by a manual stop switch on control console 25, the machine will complete sufficient motion to reduce the phase difference between the command signal and the reference signal to zero and will then itself stop. As noted above, however, the information signals from director 22 will in this case persist in the phase they last had.

If now, however, the phase of the reference signal seen by the servo-system is changed by manually rotating the rotor of phase shift resolver 145, the phase demodulator 138 will again see a phase difference and will put out an appropriate signal to D.-C. amplifier 139 which will actuate the servo in the same manner as it would be actuated by a command coming from the director. Thus, when desired, the automatic program can be stopped and the machine can be controlled by a human operator by the use of manual phase shift resolver 145. As noted above, the manual phase shift resolver 145 may be positioned either on the machine tool 24 itself or, preferably, on control console 25. This simple flexible transfer from automatic to human operation is one of the important advantages attainable from a system utilizing a director having an output suitable for directly actuating an analogue servo as distinguished from a digital servo.

The coding for an automatic program stop may be seen by turning to the tape coding chart shown in FIG. 4. It will be noted that the coding for the letters A through J, normally used to encode the clock cycle time, and for the numbers one through zero respectively, is identical except in the X and O channels which are not used as a part of the numerical 1—1—2—5 code. Note that the X channel is perforate for all letters of FIGURE 4.

The X channel, therefore, may be used to command a program stop by omitting the perforation in this channel in the coding for the clock cycle time of the command after which it is desired to initiate a program stop. Thus, when a block is read whose clock cycle is encoded in one of letters A through J but having a hole in the X channel missing, a program stop operation is initiated as follows:

The special encoded block is sensed as it is read from the tape, but the block is fed to intermediate storage in the usual fashion. The block in final storage at this time is digested or converted in the normal mode. At the end of the clock cycle time in final storage, final storage is reset and intermediate storage (containing the program stop block) is transferred into final storage as in a normal cycle. At this time, however, the command is inhibited which normally starts the tape reader and signals for digestion of the information in final storage. This latter action produces the program stop in such a fashion that none of the information in the director is modified or destroyed.

The detailed manner in which this may be accomplished may be seen as follows: The output of the tape channel may, for example, normally be used to provide the reset pulse overline 59 to the program stop flip-flop 56 when a hole in the channel in the clock cycle for a given normal command is sensed. When a program stop coding is sensed which does not have such a hole in the channel, no pulse is supplied over line 59 to reset program stop flip-flop 56. The command containing the program stop clock cycle special coding will, however, be read into intermediate storage in the usual fashion and the command already in final storage will also be executed in the normal mode. At the end of the execution of this command the pulse distributor will emit a pulse over line 49 which will clear final storage and will transfer the contents of intermediate storage to final storage. Of course, the command is transferred in the program stop command.

When the pulse causing this transfer has passed through delay elements 50, 52 and 54 and has produced the foregoing action, it will be applied over line 55 to program stop flip-flop 56. By virtue of the fact, however, that no reset pulse was previously applied over line 59 when the program stop command was read, this pulse being applied to the set input of flip-flop 56 over line 55 will find the flip-flop already in the set condition and will therefore not produce a pulse over line 57 to again start the tape reader.

For manual stop and start control, a switch may conveniently be provided having its switch arm 151 connected to the output line 57 of program stop flip-flop 56 and having one terminal 147 connected to ground, a second terminal 148 open circuited, and a third terminal 149 connected to a source 150 of pulses of the type normally supplied by the output of program stop flip-flop 56.

In this manner, when the switch arm 151 is on open circuited terminal 148 as shown, the director is set for completely automatic operation and will not be stopped unless the reader 21 senses a program stop coding. If, however, switch arm 146 is connected to terminal 147, a start pulse put out by flip-flop 56 will be shorted out or connected to ground. Thus a manual stop may be achieved by placing switch arm 151 on contact 147.

Furthermore, if a program stop has been read or if the tape has been manually stopped and a manual restart is desired, switch arm 151 may be momentarily placed on terminal 149 in order to apply a pulse to tape reader 21 and to pulse distributor 48 to start the automatic operation of the director.

Figure 18:
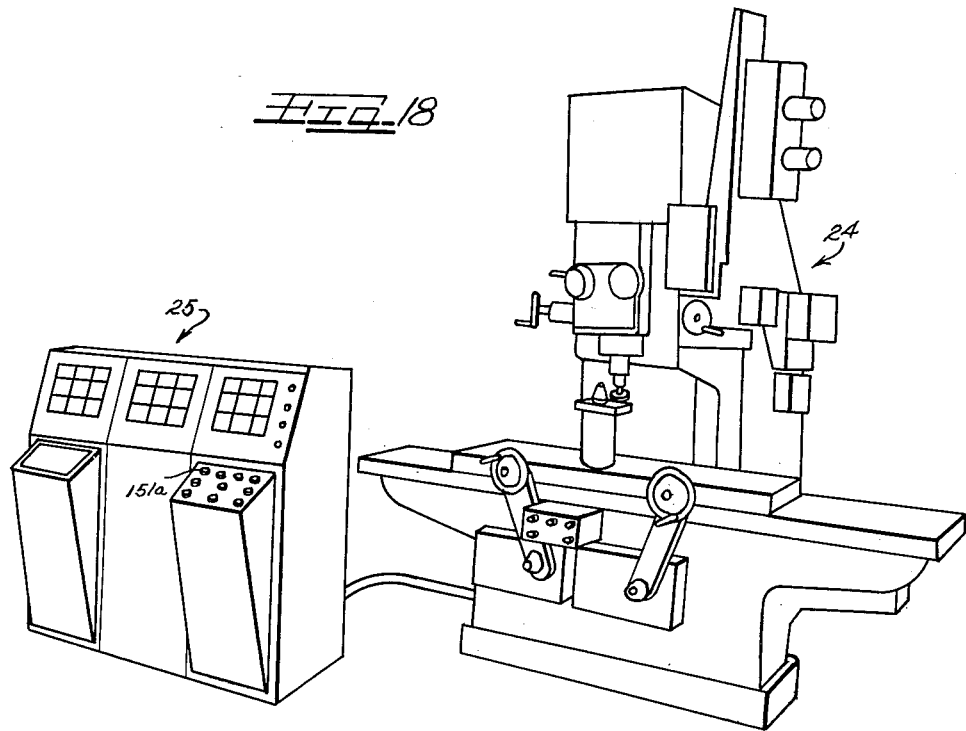
FIGURE 18 is a perspective view showing a control console and a director adjacent a milling machine.

Switch arm 151 may be actuated by a knob 151a on the control console 25 as illustrated in FIGURE 18.

In practice, it may also be convenient to use the X, the O, or the CK (check) channels of the tape shown in FIGURE 4 in a more complete code adapted to control the "Flexowriter" which is one commercially available unit for perforating tape suitable for photoelectric tape reader 21. As is well known in the art, it is common practice to make up a master paper tape from the results determined by a computer. This master tape is desirably checked and rechecked for errors by the Flexowriter itself before perforated copies of the master tape are run off. In this and other operations of related equipment, it may be desirable to expand the coding used for the operation of the director itself. The coding shown in FIGURE 4, however, is included in any expanded code and is itself all that is required for the normal operation of the director in accordance with the present invention.

In practice, a complete manual mode of operation of both the tape reader and director are conveniently provided. Thus the switch 151 may be used to initiate either a manual stop or a manual start of the entire system. Manually operated resolver such as 145 are also provided to control the motion along any axis. Additional manual controls are conveniently provided to perform the following functions separately and independently. Actual control connections may be made in a manner which will be obvious to those skilled in the art and are not illustrated in detail herein.

Manual controls are conveniently provided for resetting and transferring intermediate storage to final storage; for resetting the five decade pulse distributor counters; for resetting the data distributor to its normal position; for setting the pulse distributor control flip-flop 91 to gate on the 20 kc. input to the clock cycle control; for resetting all other flip-flops; for commanding the tape reader to read a single block of information into intermediate storage; and for switching the master oscillator 66 on or off. These controls are also preferably located on the control console 25.

The electrical connection for these controls are not shown in detail herein in order to simplify the drawing and since it is believed that the mode of accomplishing these functions per se would be apparent to one skilled in the art in view of the foregoing discussion. It will be understood, however, that the use of such manual controls is made practical only by the fact the director of the present inventions can be stopped and still continue to provide an output signal in the manner explained above. In practice, either the manual or automatic mode of operation may be selected for example, by a master switch on control console 25 which may be ganged with switch arm 151.

In practice, the use of a manual or automatic mode selector switch and of the various manual controls noted above leads to the following manual starting procedure which is used in preparing the director for automatic operation. The data distributor is set at its home or normal position in which the counters read zero. The content of intermediate storage is transferred to final storage and intermediate storage is reset. Final storage is reset as are the pulse distributor counters. The master oscillator is turned off. All remaining flip-flops are reset. The first block of information from the tape is then read into intermediate storage. This information is then transferred to final storage and intermediate storage is reset. The master oscillator is then switched on and the mode control switch is thrown to automatic operation. Simultaneously, the tape reader 21 is signalled to start and the 20 kc. signal is gated on to the clock cycle control and pulse distributor.

As noted above, the director shown in FIG. 5 is adapted to execute any given command during one of a predetermined number of program selected time intervals through the functioning of the clock cycle control unit 46. In the embodiment of FIG. 5, the manual controls, normally placed on control console 25 as discussed above, do not include any means to modify the clock cycle time specfied during automatic operation of the machine. Provision is made for such manual modification of the program specified clock cycle time in the embodiment of the director shown in FIG. 12. In practice, a given program including the clock cycle times for each command may be computed in advance on the assumption that a given article is to be made from a particular material such as a soft metal such as aluminum, for which relatively fast clock cycle times may be used. If later it is desired to cut the same article from a harder metal such as steel, it is apparent that it would be desirable to have a manual means by which the clock cycle time specified in the automatic program may be reduced. This, of course, would permit the use of the same program to cut the same article from different metals.

In FIG. 12, components or units corresponding to those of the director of FIG. 5 have been indicated by the same reference characters used in FIG. 5. The basic difference between the two embodiments is that in FIG. 12 the input signals supplied through gate 93 to the clock cycle control unit 46 are not derived from the master oscillator 66 as in FIG. 5 but rather from a variable frequency oscillator 160. The output of variable frequency oscillator 160 is applied to gate 93 over a line 161. The frequency of oscillator 160 may be varied in a manner per se well known in the art by adjusting a bias potential applied over line 162 from the wiper arm 163 of a potentiometer 164 having one end connected to a bias potential source terminal 165 and having the opposite end connected to ground. The control for wiper arm 163 may conveniently be positioned on control console 25 or on the machine being controlled. Of course, the variable frequency oscillator 160 is such as to have a tuning range including at its approximate mid-point a 20 kilocycle frequency corresponding to the 20 kilocycle frequency derived from frequency divider 77 in FIG. 5 and therein applied through gate 93 to the clock cycle control unit 46. The wiper arm of potentiometer 154 may then be used to vary the frequency of this signal upwardly or downwardly by any convenient or practical ratio.

It will be obvious from a reconsideration of the operation of the clock cycle unit 46 shown in detail in FIG. 7 that increasing the frequency of the input pulses applied over line 78 to gate 93 will decrease the actual time interval required for the counters of the pulse distributor to complete their count as against the time specified by the program tape. Similarly, decreasing the frequency of the input pulses applied over line 78 will increase this time. Of course, the dial for the potentiometer wiper arm 163 may be conveniently calibrated to directly indicate the ratio of increase or decrease.

Although the introduction of the variable frequency oscillator 160 at this point in the circuit poses no problem for the operation of the clock cycle control unit 46 or pulse distributor 48, it does pose a distinct problem for the operation of the phase modulator unit 125. It will be recalled from the above discussion of the circuit of FIGURE 9, that the operation of the phase modulator is predicated upon the assumption that each of the information pulses is synchronized with a "B" pulse from the master oscillator 66. It will be apparent that in FIG. 12 the pulses derived by the pulse distributor and clock cycle control from the variable frequency oscillator 160 will not normally be synchronized with any of the pulses from master oscillator 66. It will be noted in FIG. 12 that line 126 still applies the "A" pulses from output line 75 of pulse forming circuit 69 to the phase modulator 125. And that line 127 still applies the "B" pulses to the phase modulator as shown in both FIG. 12 and FIG. 9. The information pulses such as the pulses from the "X" sign gates however, should be synchronized with the occurrence of the "B" pulses in order to assure proper operation of the phase modulator shown in FIG. 9.

In order to insure this synchronization, the "B" pulses are in FIG. 12 also applied over a line 127a to a synchronizing unit 165. The detailed circuitry for each of the four identical circuits of this synchronizing unit is shown in FIG. 13 and will be described below. It should be noted at this time, however, that the divide-by-two flip-flops 111, 113 and 115 in the x, y, and z channels respectively, as shown in FIGURES 5 and 8, are in FIG. 12 interposed between the output of synchronizer 165 and the input of sign gate 62 rather than between the output of gating matrix 64 and the input of sign gate 62 as shown in FIG. 5 so that the count-down is made on synchronized rather than on randomly occurring pulses.

Turning now to FIG. 13 there is shown the detailed circuitry by which the relatively randomly occurring information pulses from the output gating matrix 64 are synchronized to occur simultaneously with one of the pulses in the train of "B" pulses from the master oscillator 66. Thus, the reference "B" pulses on line 127a which connects with line 74 from the pulse forming circuit 69 in FIG. 12 are shown in FIG. 13 as being applied to one of the two input terminals of a coincidence "and" gate 166. "And" gate 166 may be any circuit having at least two input terminals and one output terminal and being connected so that an output pulse applied to one of the input terminals will appear at the output terminal only if a second signal is simultaneously applied to the other input terminal which, in FIG. 13, is shown connected by a line 167 to the output of a buffer amplifier stage 168 which operates in a manner to be described below. The output of "and" gate 166 is applied to the binary input terminal of a flip-flop 169, over a line 170. The reset output terminal of flip-flop 169 is connected by line 171 to the reset input terminal of a second flip-flop 172. The set output terminal of flip-flop 172 is connected by a line 173 to the input of buffer amplifier 168. The random information pulses from output gating matrix 64 are applied over a line 174 to the set input terminal of flip-flop 172 while the synchronized output pulses are derived on a line 175 which is connected to the reset output terminal of flip-flop 172.

The mode of operation by which the circuit of FIG. 13 synchronizes each of the random information pulses on line 74 with one of the fixed frequency reference "B" pulses on line 127a to provide one synchronized output pulse on line 175 for each random information pulse applied to input line 174 is as follows. It will be noted that the set output terminal of flip-flop 172 is connected through line 173 and buffer amplifier 168 (which may conveniently be an emitter follower transistor amplifier stage) and line 167 to one input terminal of gate 166. Thus, gate 166 is controlled by the output of flip-flop 172 so that the gate is enabled or open when the flip-flop 172 is in its set condition and so that the gate 166 is disabled or closed when flip-flop 172 is in its reset condition. As will appear from the discussion below, the normal state of both the flip-flop 169 and flip-flop 172 is the reset state so that gate 166 is normally closed.

When one of the random information pulses, as from the "x" channel in FIG. 12, is applied over line 174 to the set input terminal of flip-flop 172, the state of this flip-flop is changed from its reset to its set condition thereby providing a signal over line 173 which is applied through buffer amplifier 168 to enable the gate 166. Prior to this occurrence, of course, the regularly recurring fixed frequency "B" pulses applied over line 127a to gate 166 have not been passed since the gate was in a closed condition. As soon, however, as an information pulse sets flip-flop 172 thereby opening gate 166, the next "B" pulse which occurs on line 127a will be passed through "and" gate 166 and applied over line 170 to the binary input terminal of flip-flop 169. Output is taken from flip-flop 169 over line 171 which is connected from the reset output terminal of flip-flop 169. Hence, if flip-flop 169 is already in its reset condition, the first "B" pulse applied over line 170 to its binary input terminal will simply set the flip-flop to its set condition but will not provide an output over line 171. Gate 166 therefore remains open and the next "B" pulse which occurs will again be passed and applied over line 170 to flip-flop 169 which is now set and will therefore be changed to its reset condition to consequently provide an output pulse over line 171.

This pulse from the reset output terminal of flip-flop 169 is applied over line 171 to the reset input terminal of flip-flop 172. It will be recalled that the cycle of operation of the circuit was initiated by a random information pulse applied to the set input terminal of flip-flop 172 over line 174. Therefore, the flip-flop 172 will necessarily be in its set condition and the reset pulse applied from flip-flop 169 over line 171 will reset flip-flop 172. This action has two effects. First, it generates an output pulse on line 175 which is connected to the reset output terminal of flip-flop 172. This output pulse is thus synchronized in time with the "B" pulse from line 127a which was passed through the "and" gate 166 and reset the flip-flop 169. Secondly, the reset pulse on line 171 returns the flip-flop 172 to its reset condition thereby disabling "and" gate 166 until such time as another information pulse is applied to flip-flop 172 over line 174.

It is thus seen that the reset pulse from flip-flop 169 which generates the synchronized output from the reset output terminal of flip-flop 172 also closes the "and" gate 166 so that future reference or fixed frequency "B" pulses will not be passed until another information pulse is applied to flip-flop 172 over line 174. The circuit is thus normally in a quiescent state with flip-flops 169 and 172 both in the reset condition, and with gate 166 normally closed until a random information pulse is applied to it. When such a pulse is applied, the circuit will generate one, and only one, output pulse on line 175 which will be synchronized in time with one of the "B" pulses applied over input line 127a.

Normally, of course, the random pulse on line 174 will not initially occur at the same time as one of the "B" pulses on line 127a. If, however, by chance, the random information pulse should occur in time coincidence with one of the "B" pulses so that the set output from flip-flop 172 is applied through buffer 168 to gate 166 at the same time as one of the "B" pulses, one of two things may happen depending upon circuit timing of the order of fractions of microseconds. The "B" pulse may be passed by the "and" gate or it may not be passed. In practice, however, this uncertainty poses no real problem since if this "B" pulse is passed then the circuit operates as discussed above. On the other hand, if this "B" pulse is not passed, then the next "B" pulse which occurs will be passed since it will be understood that the set output signal derived from flip-flop 172 and applied through buffer 168 to the "and" gate 166 is a continuing signal which persists until the flip-flop 172 is returned to its reset condition by the pulse emitted over line 171 from flip-flop 169.

It will thus be seen that the circuit of FIG. 13 provides a means for synchronizing each one of a train of randomly occurring pulses from a first pulse source with one pulse from a train of fixed frequency reference pulses derived from a second source. Although this particular synchronizing circuit is particularly adapted for the needs of the system shown in detail in FIG. 12, it will be understood that this circuit, as well as many of the other circuits above discussed, such as the phase modulator 125 or the pulse distributor 48 and their associated circuitry, may find general application in systems other than that disclosed herein.

In FIG. 12, the operation of the synchronizer 165 as discussed above is such as to insure that each of the information pulses derived from pulse distributor 48 through output gating matrix 64 coincides in time with one of the "B" pulses derived over lines 74 and 127a from pulse forming 69. This in turn assures the proper operation of phase modulator 125 when the synchronized pulses are applied through sign gate unit 62 to the phase modulator. The output of the phase modulator for each channel is then applied to the servo-system as shown in detail in FIG. 11 and as discussed above in connection with FIG. 5. In all other respects, the operation of the system of FIG. 12 is identical with that of the system of FIG. 5.

Furthermore, the overall type of construction of the two systems is substantially the same.

In either unit, as noted above, plug-in module transistorized construction is preferably used throughout the director and in the various other components of the system. By this procedure, units performing the same logical function such as gates or flip-flops are of the same construction and circuitry and may be easily replaced by spares kept on hand.

Furthermore, each binary plug-in unit such as a one-shot multi-vibrator or flip-flop, etc. is constructed to also provide a visual output indication by means of connections to neon lights which are mounted on the control panel. By this means, the content of intermediate and final storage and the states of various other operating units of the system are at all times visible to the operator seated at the control panel. Of course, the customary power supplies are used and suitable meters therefor may also be mounted on the control panel. The entire equipment may conveniently be housed in standard enclosed relay rack cabinets.

While the principles of the invention have now been made clear, there will be immediately obvious to those skilled in the art many modifications in structure, arrangement, proportions, the elements and components used in the practice of the invention, and otherwise, which are particularly adapted for specific environments and operating requirements without departing from those principles. The appended claims are therefore intended to cover and embrace any such modification within the limits only of the true spirit and scope of the invention.

I claim as my invention:

1. An analog servo-mechanism adapted to control the mechanical motion of a movable member in accordance with the phase difference between first and second trains of rectangular waves comprising, a phase demodulator, means to apply a first of said trains of retangular waves directly to a first input of said phase demodulator, means to convert said second train of rectangular waves to a sine wave having the same phase as said second train of rectangular waves, means to apply said sine wave to stator coils of a feedback resolver, means to control the position of the rotor of said feedback resolver in accordance with the motion of said movable member, means to apply an output signal derived from the rotor of said feedback resolver to a second input of said phase demodulator, said phase demodulator comprising means to produce from said sine wave signal derived from said rotor a third train of rectangular waves having the same phase as said sine wave and means to produce a unidirectional voltage representative of the phase difference between said third train of rectangular waves and said first train of rectangular waves, and means to control the motion of said movable member in accordance with the magnitude and polarity of said unidirectional voltage.

2. Apparatus for controlling a machine in accordance with a predetermined program comprising, a director connected for on-line operation to directly actuate an analogue servo-mechanism controlling the operation of said machine, input means for sequentially applying to said director a predetermined program comprising a series of individual commands, each of said commands containing information encoded in a 1—1—2—5 binary-decimal code, register means to store the information contained in one of said commands, means to produce in a predetermined time interval a train of pulses consisting of a decimal number of pulses determined by the information in said stored command, means to produce first and second output signals of the same frequency, means to apply said train of pulses to phase modulate one of said output signals to a degree proportional to the number of pulses in said train, means to apply said first and second output signals to said servo-mechanism, said analogue servo-mechanism being responsive to the phase difference between said first and second output signals to actuate said machine to an extent determined by the information in said input program.

3. In an automatic system for controlling a machine, a director connected for on-line operation to directly actuate an analogue servo-mechanism controlling the operation of said machine, input means for sequentially applying to said director a predetermined program comprising a series of individual commands, each of said commands containing information digitally encoded in a plurality of discrete electrical signals, means to store the information contained in one of said commands, means to produce in a predetermined time interval a train of pulses consisting of a number of pulses determined by the information in said stored command, first and second countdown circuits connected to be actuated from a common master source to produce first and second output signals respectively, means to apply said train of pulses to one of said countdown circuits to phase modulate its output signal to a degree proportional to the number of pulses in said train, means to apply said first and second output signals to said servo-mechanism, said analogue servo-mechanism being responsive to the phase difference between said first and second output signals to actuate said machine to an extent determined by digital information in said input program.

4. In an automatic system for controlling a machine, a director connected for on-line operation to directly actuate an analogue servo-mechanism controlling the operation of said machine, input means for sequentially applying to said director a predetermined program comprising a series of individual commands, each of said commands containing information digitally encoded in a 1—1—2—5 binary-decimal code, register means to store the information contained in one of said commands, pulse generating means to produce in a predetermined time interval a train of pulses consisting of a decimal number of pulses determined by the information in said stored command, said pulse generating means comprising a first counting circuit, a pulse generator for producing a sequence of pulses of predetermined frequency, means to apply said pulses to a cascaded series of countdown circuits, program controlled means to selectively apply pulses from an input or an output of one of said countdown circuits to the input of said first counting circuit, and program controlled means to derive a predetermined number of pulses from said first counting circuit during each cycle of its operation, manually adjustable means to vary the frequency of said pulse generator so as to vary said predetermined time interval called for by said program instructions, first and second output countdown circuits, means to apply a master signal to said first and second output countdown signals to produce first and second output signals of the same frequency, synchronizing means to prevent the occurrence of any of said train of pulses coincidentally with the occurrence of said signals applied to said output countdown circuits, means to apply said train of pulses to one of said output countdown circuits to phase modulate one of said output signals to a degree proportional to the number of pulses in said train, means to apply said first and second output signals to said servo-mechanism, said analogue servo-mechanism being responsive to the phase difference between said first and second output signals to actuate said machine to an extent determined by the digital information in said input program.

5. In an automatic system for controlling a machine, a director connected for on-line operation to directly actuate an analogue servo-mechanism controlling the operation of said machine, input means for sequentially applying to said director a predetermined program comprising a series of individual commands, each of said commands containing information digitally encoded in a plurality of discrete electrical signals, means to store the information contained in one of said commands, a master oscillator connected to provide first and second trains of pulses of predetermined frequency, said first train of pulses being 180° out of phase with said second train of pulses, a countdown circuit, means to apply said first train of pulses to said countdown circuit, said countdown circuit being connected to provide a reference output signal which is a symmetrical wave form, a second countdown circuit connected as a phase modulator, means to apply said first train of pulses to said phase modulator, said phase modulator being connected to provide an output signal which is a symmetrical wave form, pulse distributor means to generate a predetermined number of pulses in a predetermined time interval in accordance with said digitally encoded input information, synchronizing means to synchronize each of said predetermined number of pulses with one of the pulses in said second train of pulses from said master oscillator, and means to apply said synchronized pulses to said phase modulator circuit to phase modulate the output thereof with respect to said reference output signal by an amount proportional to the number of said predetermined number of pulses, means to apply said reference output signal and said phase modulated output signal to said servo-mechanism, said analogue servo-mechanism being responsive to the phase difference between said reference and said modulated output signals to actuate said machine to an extent determined by the digital information in said input program.

6. Apparatus for automatically controlling a machine tool comprising, an analogue servo-system adapted to be connected to mechanically actuate one element of said machine tool in response to phase modulated electrical signals applied to said servo-system, a director connected to provide a phase modulated electrical signal directly to said servo-system, reading means for reading a stored digitally coded input program into said director, said reading means being connected to apply to said director electrical input signals representing the information contained in said stored program, said program comprising a sequence of individual commands, each of said commands containing information represented in a 1—1—2—5 binary-decimal code, means to stop the operation of said reading means after one command has been read, means normally connected to restart the operation of said reading means after said one command has been executed, and means to render said last named restart means inoperative so as to stop the operation of said director, said director including means to provide an output signal of fixed phase value to said servo-system when the operation of said director is so stopped.

7. In an automatic system for controlling a machine, a director connected for on-line operation to directly actuate an analog servo-mechanism controlling the operation of said machine, input means for sequentially applying to said director a predetermined program comprising information digitally encoded in a plurality of discrete electrical signals, storage means to store the information contained in one of said commands, timing pulse generating means including means for generating a plurality of series of timing pulses in phase displaced relation, command pulse generating means for producing in a predetermined time interval a train of command pulses consisting of a number of pulses determined by the information in said storage command, means for applying one of said series of timing pulses to said command pulse generating means to synchronize each command pulse with a pulse of said one of said series of timing pulses, a first countdown circuit responsive to another of said series of timing pulses to develop a first output signal, means for applying said train of command pulses to said first countdown circuit to phase modulate said first output signal to a degree proportional to the number of pulses in said command pulse train, a second countdown circuit connected to said timing pulse generator to produce a second output signal, means to apply said first and second output signals directly to said servo-mechanism, said analog servo-mechanism being responsive to the phase difference between said first and second output signals to actuate said machine to an extent determined by digital information in said input program.

8. In an automatic system for controlling a machine, a director connected for on-line operation to directly actuate an analog servo-mechanism controlling the operation of said machine, input means for sequentially applying to said director a predetermined program comprising information digitally encoded in a plurality of discrete electrical signals, storage means to store the information contained in one of said commands, timing pulse generating means including means for generating a plurality of series of timing pulses in phase displaced relation, command pulse generating means for producing in a predetermined time interval a train of command pulses consisting of a number of pulses determined by the information in said storage command, means for applying one of said series of timing pulses to said command pulse generating means to synchronize each command pulse with a pulse of said one of said series of timing pulses, a first countdown circuit responsive to another of said series of timing pulses to develop a first output signal, means controlled by said storage means to develop positive and negative sign signals, means controlled by said positive sign signal for applying said train of command pulses to said first countdown circuit for advancing the phase of said first output signal a certain amount in response to each synchronized command pulse, means controlled by said negative sign signal for applying said train of command pulses to said first countdown circuit for retarding the phase of said output signal by said certain amount in response to each synchronized command pulse, the phase displacement of said one and said another of said series of timing pulses being sufficient to insure said phase advancing and retarding action, a second countdown circuit connected to said timing pulse generator to produce a second output signal, and means to apply said first and second output signals directly to said servo-mechanism, said analog servo-mechanism being responsive to the phase difference between said first and second output signals to actuate said machine to an extent determined by digital information in said input program.

9. In an automatic system for controlling a machine, a director connected for on-line operation to directly actuate an analog servo-mechanism controlling the operation of said machine, input means for sequentially applying to said director a predetermined program comprising a series of individual commands, each of said commands containing information digitally encoded in a plurality of discrete electrical signals, storage means to store the information contained in one of said commands, command pulse train generating means for producing in a predetermined time interval a train of command pulses consisting of a number of pulses determined by the information in said stored command, timing pulse generating means, means whereby each of said command pulses is synchronized with a pulse from said timing pulse generating means, first and second countdown circuits connected to be actuated from said timing pulse generating means to produce first and second squarewave output signals respectively, means to apply said train of command pulses to one of said countdown circuits to phase modulate its output signal to a degree proportional to the number of pulses in said train, a phase demodulator having first and second inputs, means to apply said first squarewave output signal directly to said first input of said phase demodulator, a feedback resolver mechanically controlled in accordance with motion of said movable member and having an input and an output connected to said second input of said phase demodulator, servo means responsive to the output of said phase demodulator for moving said movable member in response to a phase difference between signals applied to said first and second inputs, means to convert said second squarewave output signal to a sine wave having the same phase as said second squarewave output signal, and means responsive to said sine wave to apply a signal to said feedback resolver input.

10. In an automatic system including a machine tool, a director connected for on-line operation to directly actuate an analog servo-mechanism controlling the operation of an element of said machine tool, reading means for sequentially applying to said director a predetermined program comprising information digitally encoded in a plurality of discrete electrical signals, a control console, manually operable control means mounted on said control console and connected to control the operation of said reading means, storage means to store the information contained in one of said commands, timing pulse generating means including means for generating a plurality of series of timing pulses in phase displaced relation, command pulse generating means for producing in a predetermined time interval a train of command pulses consisting of a number of pulses determined by the information in said stored command, means for applying one of said series of timing pulses to said command pulse generating means to synchronize each command pulse with a pulse of said one of said series of timing pulses, a first countdown circuit responsive to another of said series of timing pulses to develop a first output signal, means for applying said train of command pulses to said first countdown circuit to phase modulate said first output signal to a degree proportional to the number of pulses in said command pulse train, a second countdown circuit connected to said timing pulse generator to produce a second output signal, and means to apply said first and second output signals directly to said servo-mechanism, said analog servo-mechanism being responsive to the phase difference between said first and second output signals to actuate said machine to an extent determined by digital information in said input program, and said reading means, said director and said machine tool being physically positioned so that they may each be seen from said control console.

11. In an automatic system for controlling a machine, a director connected for on-line operation to directly actuate an analog servo-mechanism controlling the operation of said machine, input means for sequentially applying to said director a predetermined program comprising a series of individual commands, each of said commands containing information digitally encoded in a plurality of discrete electrical signals, means to store the information contained in one of said commands, means to produce in a predetermined time interval a train of pulses consisting of a number of pulses determined by the information in said stored command, first and second countdown circuits connected to be actuated from a common master source to produce first and second output signals respectively, means to apply said train of pulses to one of said countdown circuits to phase modulate its output signal to a degree proportional to the number of pulses in said train, means to apply said first and second output signals directly to said servo-mechanism, said analog servo-mechanism being responsive to the phase difference between said first and second output signals to actuate said machine to an extent determined by digital information in said input program, and manual feedrate override means for adjusting the length of said predetermined time interval.

12. In an automatic system for controlling a machine, a director connected for on-line operation to directly actuate an analog servo-mechanism controlling the operation of said machine, input means for sequentially applying to said director a predetermined program comprising a series of individual commands, each of said commands containing information digitally encoded in a plurality of discrete electrical signals, means to store the information contained in one of said commands, fixed frequency timing pulse generating means, variable frequency pulse generating means, command pulse generating means for generating in a time interval controlled by the frequency of said pulses from said variable frequency pulse generator means, a plurality of trains of command pulses each consisting of a number of pulses determined by the information in said stored command, means to synchronize each command pulse with a pulse from said timing pulse generating means, a reference countdown circuit connected to said timing pulse generating means to produce a reference output signal, a plurality of channels for respectively responding to said trains of command pulses, each channel comprising a control countdown circuit connected to be actuated by pulses from said timing pulse generating means to produce a command output signal, means to apply a train of command pulses to said control countdown circuit to phase modulate said command output signal to a degree proportional to the number of pulses in said train, means to apply said reference output signal and said command output signal directly to said servo-mechanism, said analog servo-mechanism being responsive to the phase difference between said reference and command output signals to actuate said machine to an extent determined by digital information in said input program, and manual feedrate override means for adjusting the frequency of said variable frequency pulse generating means.

13. In an automatic system for controlling a machine, a director connected for on-line operation to directly actuate an analog servo-mechanism controlling the operation of said machine, input means for sequentially applying to said director a predetermined program comprising a series of individual commands, each of said commands containing information digitally encoded in a plurality of discrete electrical signals, storage means to store the information contained in one of said commands, command pulse train generating means for producing in a predetermined time interval a train of command pulses consisting of a number of pulses determined by the information in said stored command, timing pulse generating means, means whereby each of said command pulses is synchronized with a pulse from said timing pulse generating means, first and second countdown circuits connected to be actuated from said timing pulse generating means to produce first and second squarewave output signals respectively, means to apply said train of command pulses to one of said countdown circuits to phase modulate its output signal to a degree proportional to the number of pulses in said train, a phase demodulator having first and second inputs, means to apply said first squarewave output signal directly to said first input of said phase demodulator, a feedback resolver mechanically controlled in accordance with motion of said movable member and having an input and an output connected to said second input of said phase demodulator, servo means responsive to the output of said phase demodulator for moving said movable member in response to a phase difference between signals applied to said first and second inputs, means to convert said second squarewave output signal to a sine wave having the same phase as said second squarewave output signal, a manually controlled resolver having an input responsive to said sine wave and an output coupled to said feedback resolver input, and means for selectively stopping said input means and said command pulse generating means at the end of a command pulse train to permit zeroing adjustment of said manually controlled resolver.

14. In an automatic system for controlling a machine, a director connected for on-line operation to directly actuate an analog servo-mechanism controlling the operation of said machine, input means for sequentially applying to said director a predetermined program comprising a series of individual commands, each of said commands containing information digitally encoded in a plurality of discrete electrical signals, storage means to store the information contained in one of said commands, command pulse train generating means for producing in a predetermined time interval a train of command pulses consisting of a number of pulses determined by the information in said stored command, timing pulse generating means, means whereby each of said command pulses is synchronized with a pulse from said timing pulse generating means, first and second countdown circuits connected to be actuated from said timing pulse generating means to produce first and second squarewave output signals respectively, means to apply said train of command pulses to one of said countdown circuits to phase modulate its output signal to a degree proportional to the number of pulses in said train, and means to directly apply said first and second squarewave output signals to said servo-mechanism to actuate said servo-mechanism in accordance with the phase difference therebetween, said command pulse train generating means including a cascaded series of countdown circuits, means for applying input pulses to said cascaded series of countdown circuits, an output line and gate means controlled from said storage means for selectively applying pulses from said countdown circuit to said output line, whereby the input pulses to said cascaded series of countdown circuits can be interrupted at any time to discontinue phase modulation of said first squarewave output signal and subsequently resumed to reinitiate phase modulation of said first squarewave output signal, to start and stop the servo-mechanism without loss of accuracy.

15. In an automatic system for controlling a machine, a director connected for on-line operation to directly actuate an analog servo-mechanism controlling the operation of a movable member of said machine, input means for sequentially applying to said director a predetermined program comprising information digitally encoded in a plurality of discrete electrical signals, storage means to store the information contained in one of said commands, timing pulse generating means including means for generating a plurality of series of timing pulses in phase displaced relation, command pulse generating means for producing in a predetermined time interval a train of command pulses consisting of a number of pulses determined by the information in said stored command, means for applying one of said series of timing pulses to said command pulse generating means to synchronize each command pulse with a pulse of said one of said series of timing pulses, a first countdown circuit responsive to another of said series of timing pulses to develop a first rectangular wave output signal, means for applying said train of command pulses to said first countdown circuit to phase modulate said first output signal to a degree proportional to the number of pulses in said command pulse train, a second countdown circuit connected to said timing pulse generator to produce a second rectangular wave output signal, a phase demodulator having first and second inputs, means to apply said first rectangular wave output signal directly to said first input of said phase demodulator, means to convert said second rectangular wave output signal to a sine wave of the same phase, means to apply said sine wave to stator coils of a feedback resolver, means to control the position of the rotor of said feedback resolver in accordance with the motion of said movable member, means to apply an output signal derived from the rotor of said feedback resolver to a second input of said phase demodulator, said phase demodulator comprising means to produce from said sine wave signal derived from said rotor a third rectangular wave output signal having the same phase as said sine wave, and means to produce a unidirectional voltage representative of the phase difference between said third rectangular wave output signal and said first rectangular wave output signal, and means to control the motion of said movable member in accordance with the magnitude and polarity of said unidirectional voltage.

(References on following page)

References Cited in the file of this patent

UNITED STATES PATENTS

| | | |
|---|---|---|
| 2,441,175 | White et al. | May 11, 1948 |
| 2,537,770 | Livingston et al. | Jan. 9, 1951 |
| 2,604,263 | MacSorley | July 22, 1952 |
| 2,788,478 | Gray | Apr. 9, 1957 |
| 2,803,815 | Wulfsberg | Aug. 20, 1957 |
| 2,828,482 | Schumann | Mar. 25, 1958 |
| 2,843,320 | Chisholm | July 15, 1958 |
| 2,858,426 | Meserve | Oct. 28, 1958 |
| 2,858,435 | Kuhn et al. | Oct. 28, 1958 |
| 2,887,638 | Cail et al. | May 19, 1959 |